US012092652B2

United States Patent
Gorman et al.

(10) Patent No.: US 12,092,652 B2
(45) Date of Patent: Sep. 17, 2024

(54) OPTOMECHANICAL ACCELEROMETER AND PERFORMING OPTOMECHANICAL ACCELEROMETRY

(71) Applicant: Government of the United States of America, as represented by the Secretary of Commerce, Gaithersburg, MD (US)

(72) Inventors: Jason John Gorman, Silver Spring, MD (US); Thomas Warren LeBrun, Washington, DC (US); David Alexander Long, Bethesda, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 278 days.

(21) Appl. No.: 17/363,354

(22) Filed: Jun. 30, 2021

(65) Prior Publication Data

US 2023/0017010 A1 Jan. 19, 2023

(51) Int. Cl.
*G01P 15/093* (2006.01)
(52) U.S. Cl.
CPC ................... *G01P 15/093* (2013.01)
(58) Field of Classification Search
CPC .................................................. G01P 15/093
See application file for complete search history.

(56) References Cited

U.S. PATENT DOCUMENTS

| 5,418,641 A * | 5/1995 | Hendow | H01S 3/08 |
| | | | 356/519 |
| 9,417,261 B2 | 8/2016 | Salit et al. | |
| 2015/0204899 A1* | 7/2015 | Salit | G01P 15/12 |
| | | | 73/514.26 |
| 2016/0202284 A1* | 7/2016 | Paquet | G01P 13/00 |
| | | | 73/514.26 |

(Continued)

OTHER PUBLICATIONS

Zhou, F., et al., "Broadband thermomechanically limited sensing with an optomechanical accelerometer", Optica, 2021, p. 350-356, vol. 8 No.3.

(Continued)

*Primary Examiner* — Xin Y Zhong
(74) *Attorney, Agent, or Firm* — Office of Chief Counsel for National Institute of Standards and Technology

(57) ABSTRACT

An optomechanical accelerometer includes: a fiducial mass for a microscale Fabry-Perot optical cavity; a proof mass for the microscale Fabry-Perot optical cavity, such that the proof mass oscillates in a displacement motion toward and away from the fiducial mass in response to acceleration of the optomechanical accelerometer; a basal member; microscale beams that mechanically suspend the proof mass from the basal member; and the microscale Fabry-Perot optical cavity that has a cavity resonance at a cavity resonance wavelength provided by the cavity length, receives excitation radiation at an excitation wavelength that is reflected in the cavity as dynamic cavity light when the excitation wavelength is resonant with the cavity resonance wavelength, and transmits the dynamic cavity light as cavity output light when the dynamic cavity light is produced from the excitation radiation.

16 Claims, 22 Drawing Sheets

(56) References Cited

U.S. PATENT DOCUMENTS

| | | | |
|---|---|---|---|
| 2016/0223329 A1* | 8/2016 | Zandi | G01P 15/093 |
| 2017/0090064 A1* | 3/2017 | Edwards | G01P 15/093 |
| 2022/0163557 A1* | 5/2022 | Guzmán | G01P 15/0802 |

OTHER PUBLICATIONS

Zhou, F., et al., "Broadband thermomechanically limited sensing with an optomechanical accelerometer:supplement", Optica, 2021, p. 1-5, DOI: https://doi.org/10.6084/m9.figshare.13664609.

Zhou, F., et al., "Testing of an Optomechanical Accelerometer with a High-Finesse On-Chip Microcavity", OSA Technical Digest (Optical Society of America, 2019), paper JW2A.4, CLEO: Applications and Technology 2019, 2019, DOI: https://doi.org/10.1364/CLEO_AT.2019.JW2A.4.

Madugani, R., et al., "Acoustical Response Characteristics of an Optomechanical Accelerometer", OSA Technical Digest (Optical Society of America, 2018), paper JW3A.88, Laser Science 2018, 2018, DOI: https://doi.org/10.1364/FIO.2018.JW3A.88.

Zhou, F., et al., "A Fiber-Pigtailed Hemispherical Fabry-Perot Microcavity for Accelerometry and Sensing", OSA Technical Digest (Optical Society of America, 2018), paper JW4A.90, Frontiers in Optics 2018, 2018, DOI: https://doi.org/10.1364/FIO.2018.JW4A.90.

Bao, Y., et al., "A Silicon Optomechanical Accelerometer with High Bandwidth and Sensitivity", Conference: Hilton Head Workshop 2018: A Solid-State Sensors, Actuators and Microsystems Workshop, 2018, p. 366-367, DOI: 10.31438/trf.hh2018.103.

Bao, Y., et al., "A Photonic MEMS Accelerometer with a Low-Finesse Hemispherical Microcavity Readout", IEEE Xplore: 2017 International Conference on Optical MEMS and Nanophotonics (OMN), 2017, DOI: 10.1109/OMN.2017.8051490.

Bao, Y., et al., "An Optomechanical Accelerometer with a High-Finesse Hemispherical Optical Cavity", IEEE Xplore: 2016 IEEE International Symposium on Inertial Sensors and Systems, 2016, DOI: 10.1109/ISISS.2016.7435556.

* cited by examiner

OPTOMECHANICAL ACCELEROMETER AND PERFORMING OPTOMECHANICAL ACCELEROMETRY

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, MD, 20899; voice (301) 975-2573; email tpo@nist.gov; reference NIST Docket Number 21-010US1.

BRIEF DESCRIPTION

Disclosed is an optomechanical accelerometer for performing optomechanical accelerometry, the optomechanical accelerometer comprising: a fiducial mass comprising a fiducial reflective layer that provides a fiducial reflective cavity surface for a microscale Fabry-Perot optical cavity; a proof mass in optical communication with the fiducial mass and comprising a proof reflective layer that provides a proof reflective cavity surface for the microscale Fabry-Perot optical cavity, such that the proof mass oscillates in a displacement motion toward and away from the fiducial mass in response to acceleration of the optomechanical accelerometer; a basal member in fixed mechanical engagement with the fiducial mass; a plurality of microscale beams disposed on the basal member and the proof mass and that mechanically suspends the proof mass from the basal member, such that the microscale beams flex in response to the displacement motion of the proof mass relative to the fiducial mass; and the microscale Fabry-Perot optical cavity comprising the fiducial reflective layer of the fiducial mass and the proof reflective layer of the proof mass, such that the fiducial reflective layer and the proof reflective layer oppose one another and are interposed between fiducial mass and the proof mass at a cavity length that changes by an amount of displacement of the proof mass in the displacement motion relative to the fiducial mass, wherein the microscale Fabry-Perot optical cavity comprises a cavity resonance at a cavity resonance wavelength provided by the cavity length, such that the microscale Fabry-Perot optical cavity: receives excitation radiation comprising an excitation wavelength and an excitation light intensity, such that excitation radiation is reflected between the proof reflective layer and the fiducial reflective layer as dynamic cavity light when the excitation wavelength is resonant with the cavity resonance wavelength; and transmits and reflects a portion of the dynamic cavity light as cavity output light comprising a cavity output light intensity when the dynamic cavity light is produced from the excitation radiation, such that the cavity output light intensity optically indicates acceleration of the optomechanical accelerometer through mechanical displacement of the proof mass.

Disclosed is a process for performing optomechanical accelerometry, the process comprising: receiving, by a microscale Fabry-Perot optical cavity of a optomechanical accelerometer, excitation radiation comprising an excitation wavelength, the optomechanical accelerometer comprising: a fiducial mass comprising a fiducial reflective layer that provides a fiducial reflective cavity surface for the microscale Fabry-Perot optical cavity; a proof mass in optical communication with the fiducial mass and comprising a proof reflective layer that provides a proof reflective cavity surface for the microscale Fabry-Perot optical cavity, such that the proof mass oscillates in a displacement motion toward and away from the fiducial mass in response to acceleration of the optomechanical accelerometer; a basal member in fixed mechanical engagement with the fiducial mass; a plurality of microscale beams disposed on the basal member and the proof mass and that mechanically suspends the proof mass from the basal member, such that the microscale beams flex in response to the displacement motion of the proof mass relative to the fiducial mass; and the microscale Fabry-Perot optical cavity comprising the fiducial reflective layer of the fiducial mass and the proof reflective layer of the proof mass, such that the fiducial reflective layer and the proof reflective layer oppose one another and are interposed between fiducial mass and the proof mass at a cavity length that changes by an amount of displacement of the proof mass in the displacement motion relative to the fiducial mass, wherein the microscale Fabry-Perot optical cavity comprises a cavity resonance at a cavity resonance wavelength provided by the cavity length; reflecting, in the microscale Fabry-Perot optical cavity, the excitation radiation between the proof reflective layer and the fiducial reflective layer as dynamic cavity light when the excitation wavelength is resonant with the cavity resonance wavelength; transmitting and reflecting, from the microscale Fabry-Perot optical cavity, a portion of the dynamic cavity light as cavity output light comprising a cavity output light intensity when the dynamic cavity light is produced from the excitation radiation; and determining, from the cavity output light intensity, acceleration of the optomechanical accelerometer through mechanical displacement of the proof mass to perform optomechanical accelerometry.

BRIEF DESCRIPTION OF THE DRAWINGS

The following description cannot be considered limiting in any way. With reference to the accompanying drawings, like elements are numbered alike.

DETAILED DESCRIPTION

Figure 1:
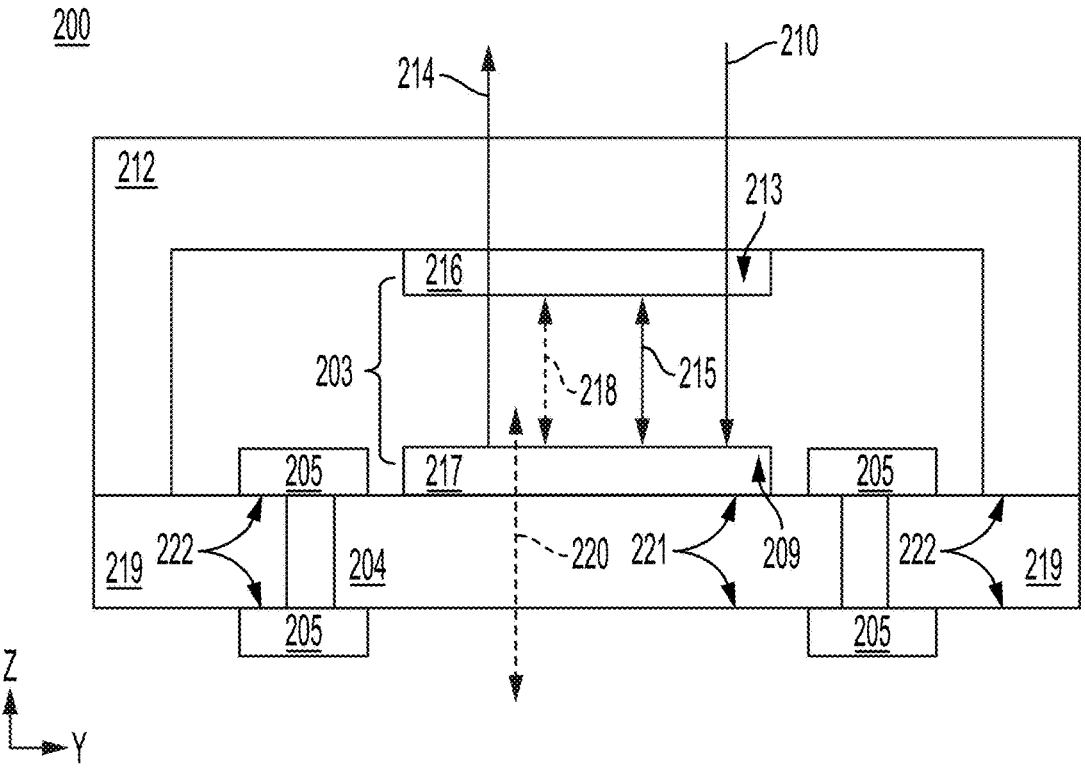
FIG. 1 shows an optomechanical accelerometer in panel A and panel B.
Figure 1:
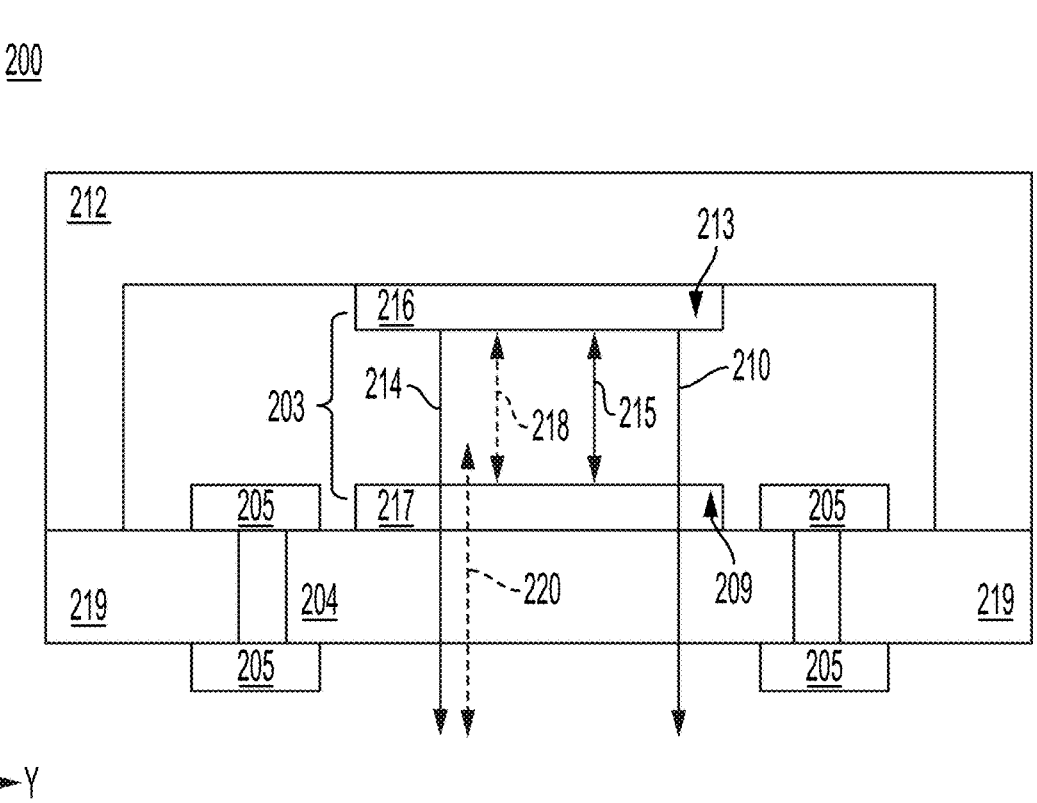
Figure 2:
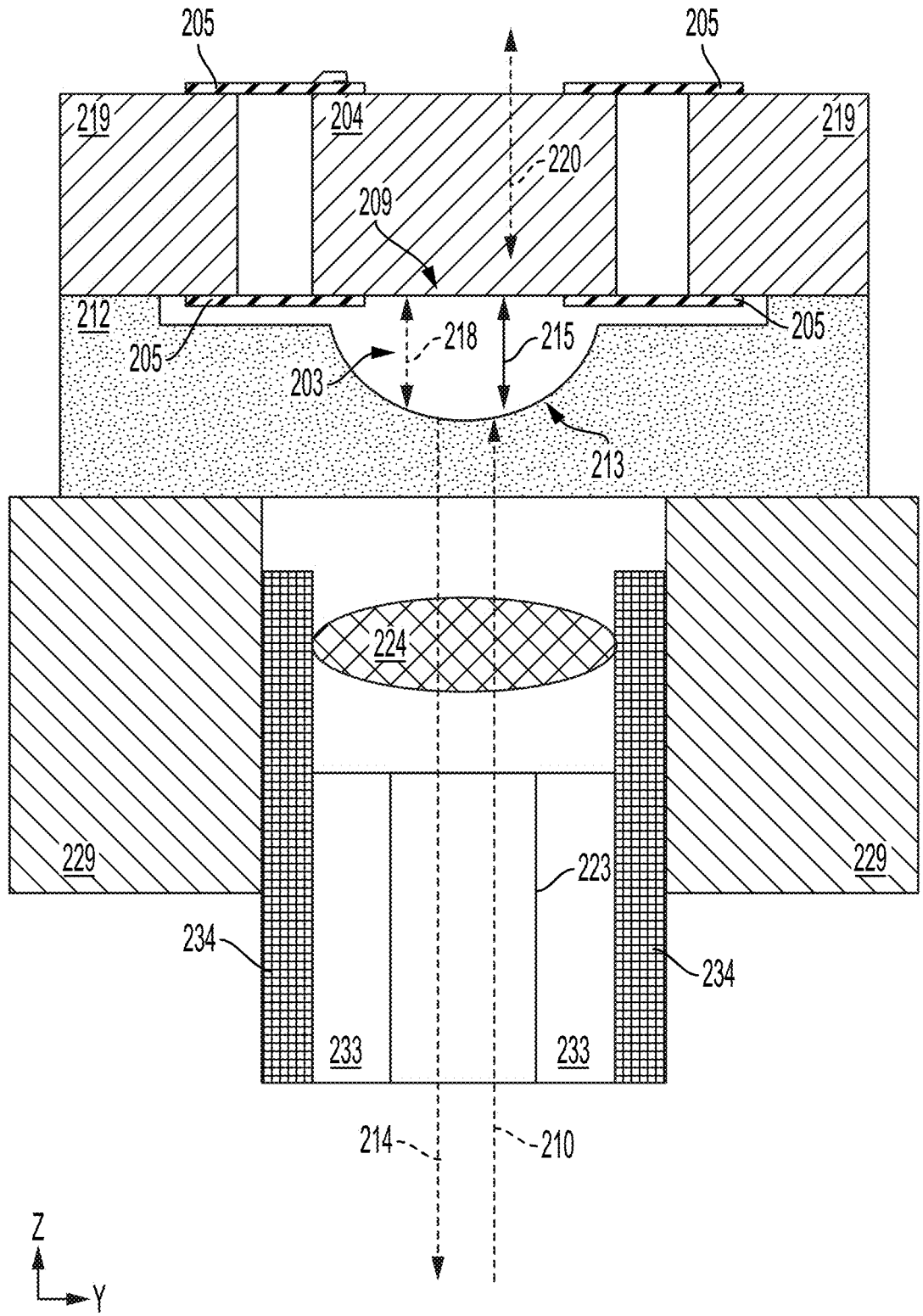
FIG. 2 shows an optomechanical accelerometer with a hemispherical microscale Fabry-Perot optical cavity.

A detailed description of one or more embodiments is presented herein by way of exemplification and not limitation.

It has been discovered that an optomechanical accelerometer described herein measures acceleration, including vibrations, inertial motion, and gravity. The optomechanical accelerometer includes a microscale Fabry-Perot optical cavity to measure displacement of a proof mass that is suspended by microscale beams from a basal member. When excited by an external acceleration, the proof mass displaces and is measured using the microscale Fabry-Perot optical cavity, wherein the measured signal can be transformed into a measured acceleration. The optomechanical accelerometer provides high sensitivity compared to conventional accelerometers of equivalent size and provides high accuracy through an internal calibration process that is linked to a laser wavelength used to measure length changes in the microscale Fabry-Perot optical cavity.

Optomechanical accelerometer 200 performs optomechanical accelerometry. In an embodiment, with reference to FIG. 1, FIG. 2, FIG. 3, FIG. 4, FIG. 5, FIG. 6, FIG. 7, FIG. 8, FIG. 9, FIG. 10, and FIG. 11 optomechanical accelerometer 200 includes: fiducial mass 212 including fiducial reflective layer 216 that provides fiducial reflective cavity surface 213 for microscale Fabry-Perot optical cavity 203; proof mass 204 in optical communication with fiducial mass 212 and including proof reflective layer 217 that provides proof reflective cavity surface 209 for microscale Fabry-Perot optical cavity 203, such that proof mass 204 oscillates in displacement motion 220 toward and away from fiducial mass 212 in response to acceleration of optomechanical accelerometer 200; basal member 219 in fixed mechanical engagement with fiducial mass 212; a plurality of microscale beams 205 disposed on basal member 219 and proof mass 204 and that mechanically suspends proof mass 204 from basal member 219, such that microscale beams 205 flex in response to displacement motion 220 of proof mass 204 relative to fiducial mass 212; and microscale Fabry-Perot optical cavity 203 including fiducial reflective layer 216 of fiducial mass 212 and proof reflective layer 217 of proof mass 204, such that fiducial reflective layer 216 and proof reflective layer 217 oppose one another and are interposed between fiducial mass 212 and proof mass 204 at cavity length 218 that changes by an amount of displacement of proof mass 204 in displacement motion 220 relative to fiducial mass 212, wherein microscale Fabry-Perot optical cavity 203 includes a cavity resonance at a cavity resonance wavelength provided by cavity length 218, such that microscale Fabry-Perot optical cavity 203: receives excitation radiation 210 including an excitation wavelength and an excitation light intensity, such that excitation radiation 210 is reflected between proof reflective layer 217 and fiducial reflective layer 216 as dynamic cavity light 215 when excitation wavelength is resonant with cavity resonance wavelength; and transmits a portion of dynamic cavity light 215 as cavity output light including a cavity output light intensity when dynamic cavity light 215 is produced from excitation radiation 210, such that the cavity output light intensity optically indicates acceleration of optomechanical accelerometer 200 through mechanical displacement of the proof mass 204. Similarly, the microscale Fabry-Perot optical cavity 203 reflects a portion of dynamic cavity light 215 as cavity output light 214 including a cavity output light intensity when dynamic cavity light 215 is produced from excitation radiation 210, such that the cavity output light intensity optically indicates acceleration of optomechanical accelerometer 200 through mechanical displacement of the proof mass 204. Here, microscale beams 205 mechanically support proof mass 204 on opposing surfaces of proof mass 204. In addition, to acceleration, external forces or pressures applied to the proof mass can also be measured by using the optical cavity to determine the motion of the proof mass.

Excitation radiation 210 can be received by fiducial mass 212 and communicated through fiducial mass 212 to microscale Fabry-Perot optical cavity 203 as shown in panel A of FIG. 1, wherein cavity output light 214 is communicated from microscale Fabry-Perot optical cavity 203 to fiducial mass 212 for communication of optomechanical accelerometer 200. In some embodiments, as shown in panel B of FIG. 1, excitation radiation 210 is received by proof mass 204 and communicated through proof mass 204 to microscale Fabry-Perot optical cavity 203 as shown in panel B of FIG. 1, wherein cavity output light 214 is communicated from microscale Fabry-Perot optical cavity 203 to proof mass 204 for communication of optomechanical accelerometer 200.

Optomechanical accelerometer 200 can include additional components to couple excitation radiation 210 into microscale Fabry-Perot optical cavity 203 and to couple cavity output light 214 out of microscale Fabry-Perot optical cavity 203. In an embodiment, with reference to FIG. 2, FIG. 3, FIG. 4, FIG. 5, FIG. 7, and FIG. 8, optomechanical accelerometer 200 includes housing 229 disposed on fiducial mass 212 and on which is disposed collar 234. Collar 234 receives lens 224 and ferrule 233 in which is disposed fiber optic 223. Fiber optic 223 communicates excitation radiation 210 to lens 224 that couples excitation radiation 210 into microscale Fabry-Perot optical cavity 203. Lens 224 receives cavity output light 214 from microscale Fabry-Perot optical cavity 203 and communicates cavity output light 214 to fiber optic 223 that couples cavity output light 214 out of optomechanical accelerometer 200. It is contemplated that fiber optic 223 and lens 224 can be optically coupled to proof mass 204 instead of fiducial mass 212. Further, light (e.g., excitation radiation 210, cavity output light 214, and the like) can propagate through free space in an absence of optical elements (e.g., fiber optic light 223, lens 224).

Figure 21:
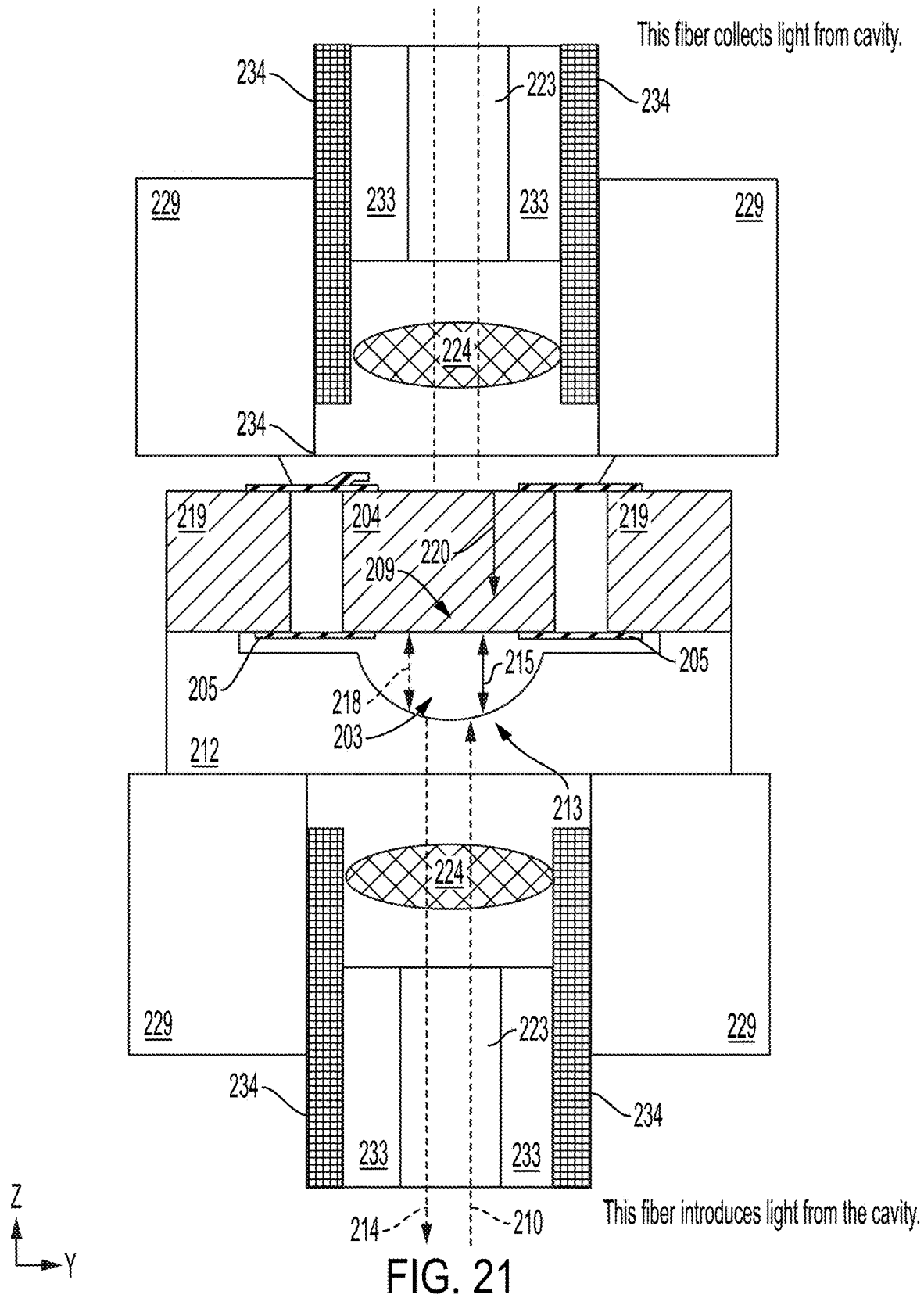
FIG. 21 shows an optomechanical accelerometer with a second fiber for collecting transmitted light.

Optomechanical accelerometer 200 can include additional components to measure cavity output light that is transmitted through the microscale Fabry-Perot optical cavity 203. In an embodiment, with reference to FIG. 21, optomechanical accelerometer 200 includes housing 229 disposed on fiducial mass 212 and on which is disposed collar 234. Collar 234 receives lens 224 and ferrule 233 in which is disposed fiber optic 223. Fiber optic 223 communicates excitation radiation 210 to lens 224 that couples excitation radiation 210 into microscale Fabry-Perot optical cavity 203. A lens receives cavity output light from microscale Fabry-Perot optical cavity 203 on the opposing side of the optomechanical accelerometer 2000 with respect to lens 224 and communicates cavity output light to a fiber optic that couples cavity output light out of optomechanical accelerometer 200. Measuring transmitted light from Fabry-Perot optical cavity 203 can reduce parasitic optical reflections that distort optical resonances and reduce displacement sensitivity.

Figure 22:
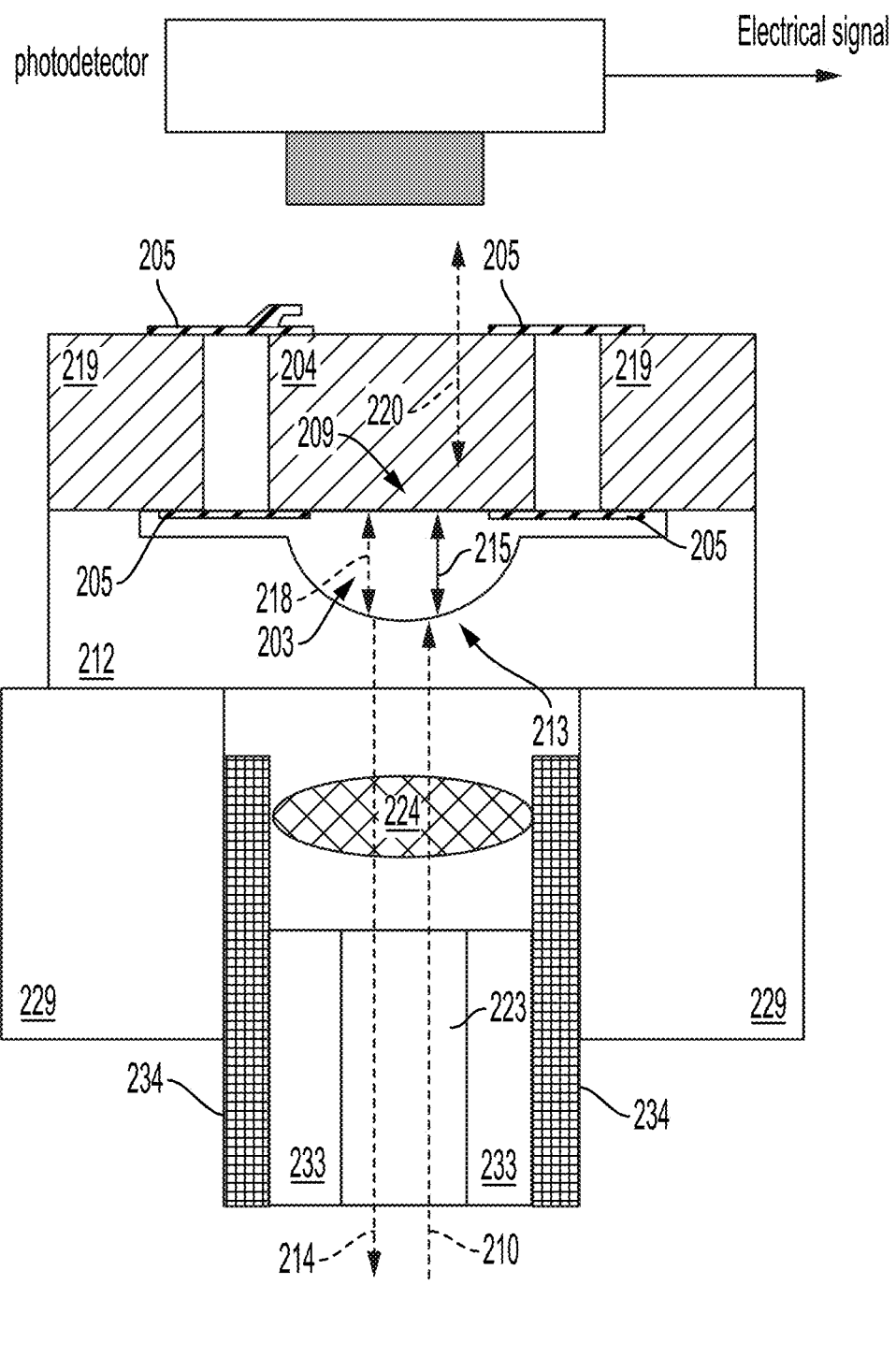
FIG. 22 shows an optomechanical accelerometer with a photodetector for measuring transmitted light.

In another embodiment, with reference to FIG. 22, optomechanical accelerometer 200 includes housing 229 disposed on fiducial mass 212 and on which is disposed collar 234. Collar 234 receives lens 224 and ferrule 233 in which is disposed fiber optic 223. Fiber optic 223 communicates excitation radiation 210 to lens 224 that couples excitation radiation 210 into microscale Fabry-Perot optical cavity 203. A photodetector receives cavity output light from microscale Fabry-Perot optical cavity 203 on the opposing side of the optomechanical accelerometer 200 with respect to lens 224, converting the optical signal to an electrical signal. The conversion from an optical to electrical can reduce the size of the sensor and provide a lower measurement noise floor in some optical signal processing schemes.

Optomechanical accelerometer 200 can include various types of microscale Fabry-Perot optical cavity 203. In an embodiment, with reference to FIG. 2, FIG. 3, and FIG. 4, fiducial reflective layer 216 and proof reflective layer 217 independently include a concave micromirror. In an embodiment, with reference to FIG. 2 and FIG. 3, microscale Fabry-Perot optical cavity 203 is a hemispherical cavity. In an embodiment, with reference to FIG. 3, proof reflective layer 217 is a concave micromirror, and fiducial reflective layer 216 is a planar micromirror, wherein microscale Fabry-Perot optical cavity 203 is a reverse hemispherical cavity. In an embodiment, with reference to FIG. 2, fiducial reflective layer 216 is a concave micromirror, and proof reflective layer 217 is a planar micromirror, wherein microscale Fabry-Perot optical cavity 203 is a hemispherical cavity. In an embodiment, with reference to FIG. 4, fiducial reflective layer 216 and proof reflective layer 217 are concave micromirrors, wherein microscale Fabry-Perot optical cavity 203 is a spherical cavity. In an embodiment with reference to FIG. 5, microscale Fabry-Perot optical cavity 203 is a planar-parallel cavity, wherein fiducial reflective layer 216 and proof reflective layer 217 are planar micromirrors.

Figure 3:
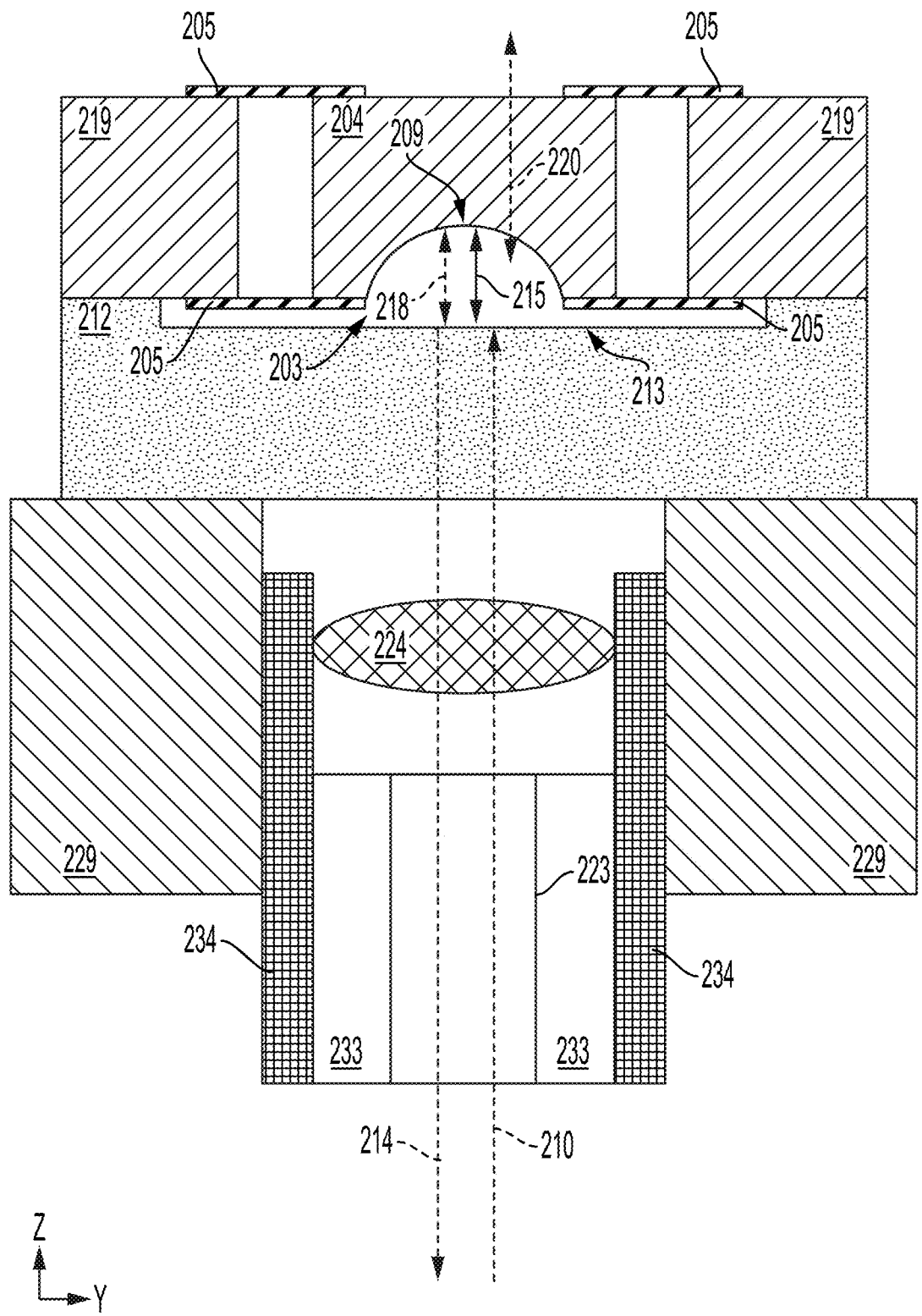
FIG. 3 shows an optomechanical accelerometer with a hemispherical microscale Fabry-Perot optical cavity.
Figure 4:
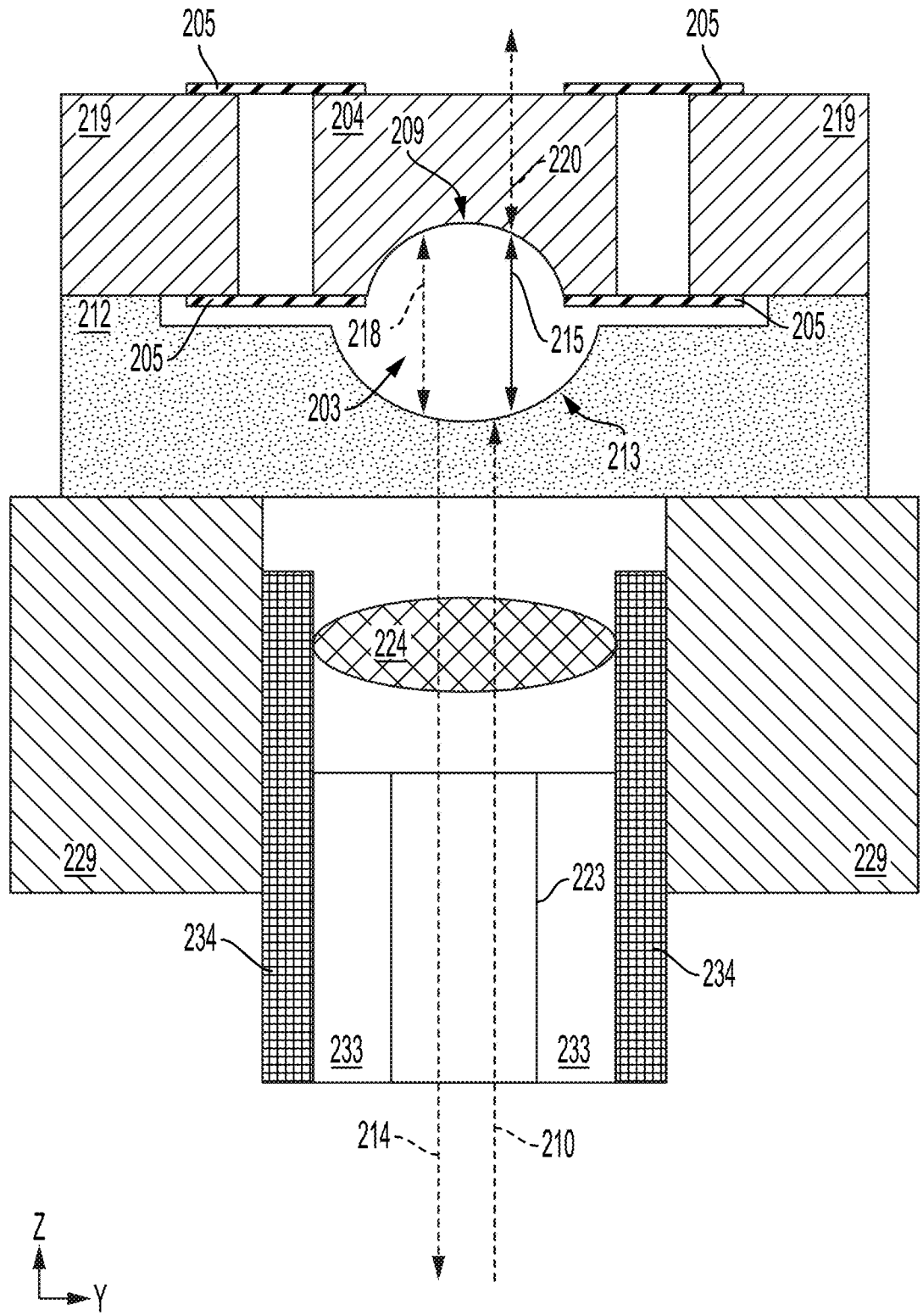
FIG. 4 shows an optomechanical accelerometer with a spherical microscale Fabry-Perot optical cavity.
Figure 5:
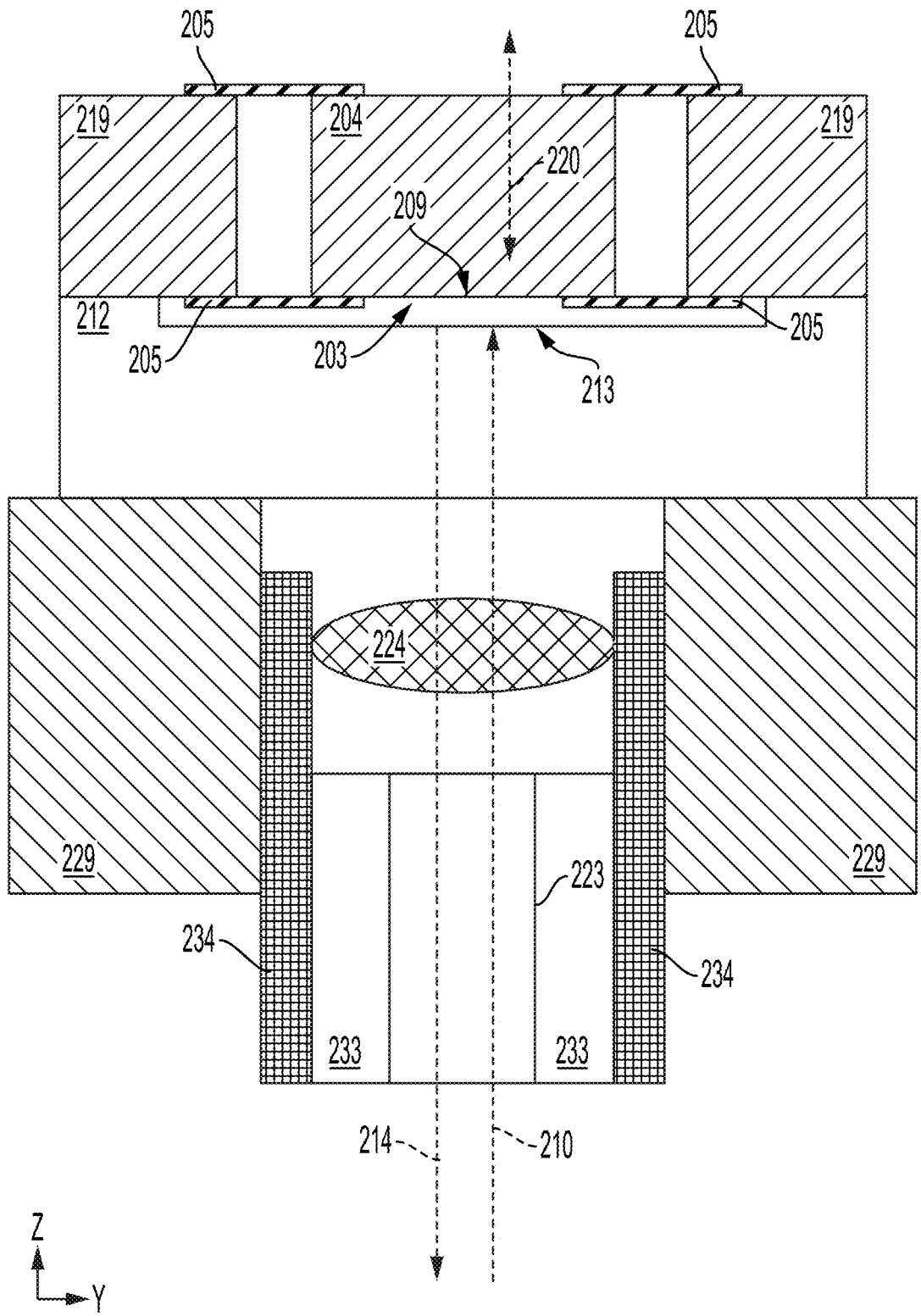
FIG. 5 shows an optomechanical accelerometer with a planar-parallel microscale Fabry-Perot optical cavity.

A spherical cavity, e.g., as shown in FIG. 4, wherein both micromirrors of microscale Fabry-Perot optical cavity 203 are concave, provides high sensitivity, increases the achievable cavity length 218, and decreases a linewidth of cavity resonances as compared with a planar-parallel cavity. While the hemispherical cavity provides optical benefits, a reverse hemispherical cavity, e.g., as shown in FIG. 3, integrates a concave micromirror into proof mass 204 that serves as the mechanical resonator and can reduce the size of accelerometer packaging, simplify the coupling of excitation radiation 210 into microscale Fabry-Perot optical cavity 203 or reduce proof mass 204 for applications where higher bandwidth is desired.

Figure 6:
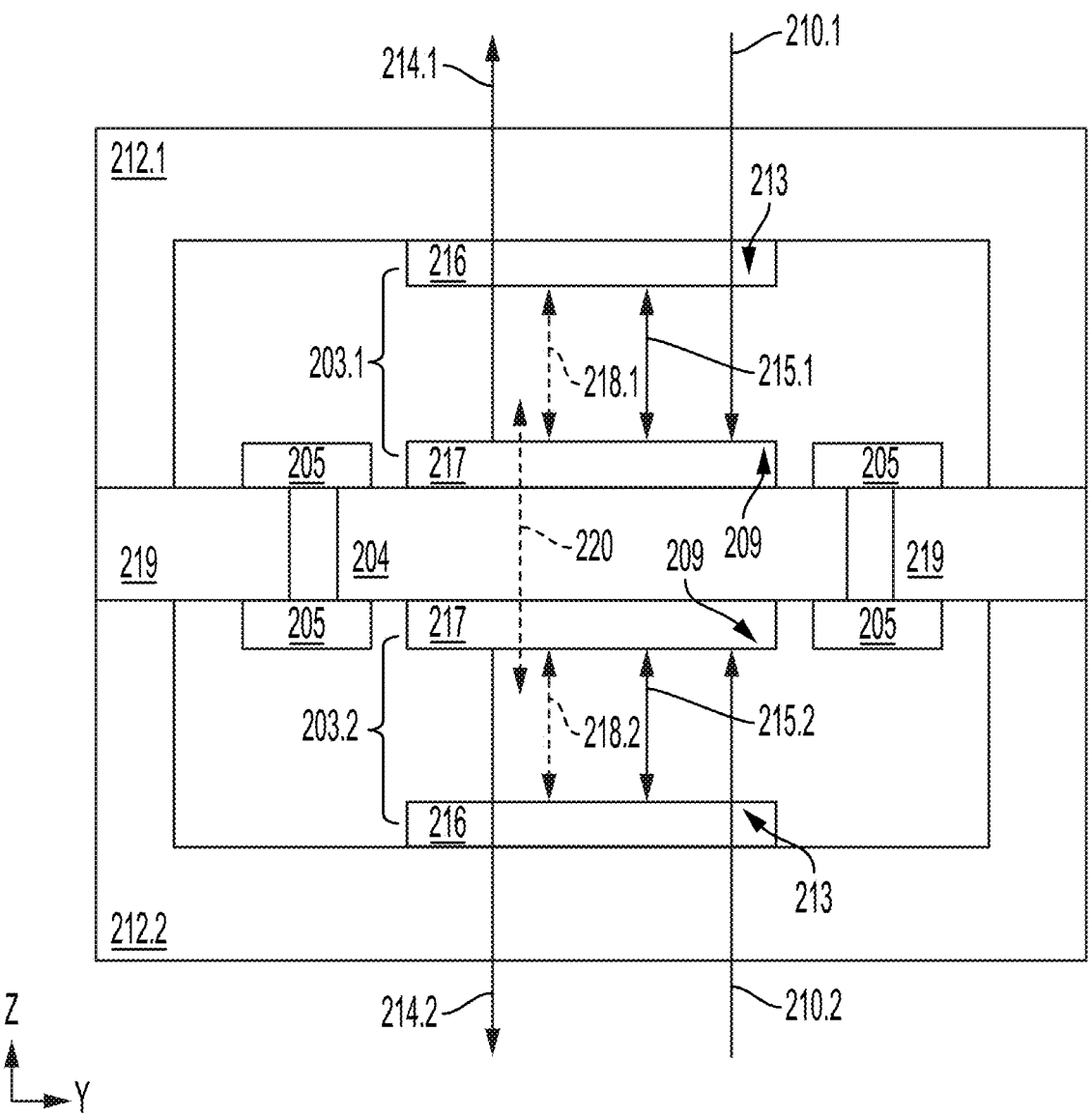
FIG. 6 shows an optomechanical accelerometer with dual microscale Fabry-Perot optical cavities.
Figure 7:
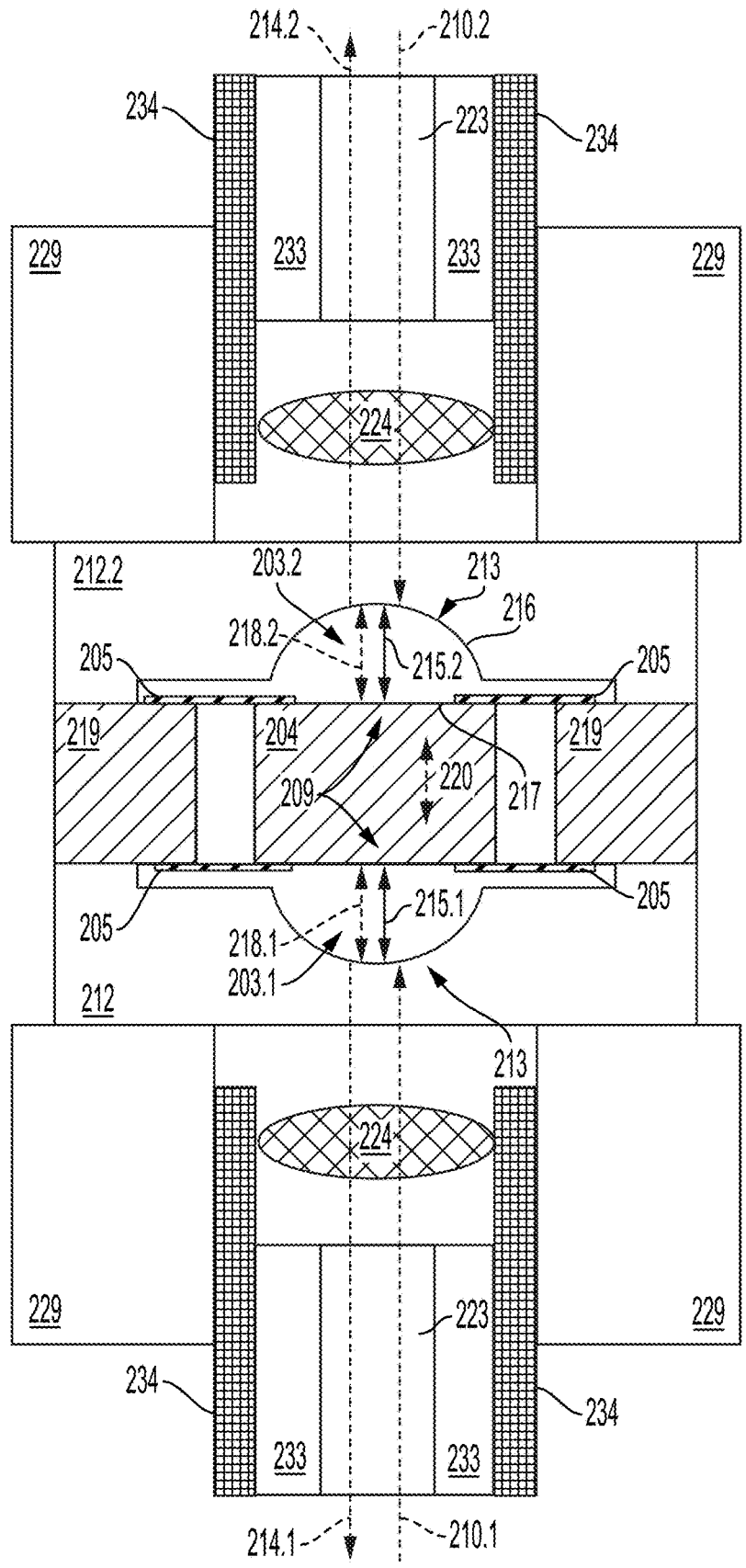
FIG. 7 shows an optomechanical accelerometer with dual microscale Fabry-Perot optical cavities.

Although optomechanical accelerometer 200 can include a single microscale Fabry-Perot optical cavity 203 to measure displacement motion 220 of proof mass 204, optomechanical accelerometer 200 can include a plurality of microscale Fabry-Perot optical cavities 203, as shown in FIG. 6 and FIG. 7, providing a differential measurement of proof mass 204.

Environmental conditions such as temperature or humidity can affect cavity length 218 due to thermal expansion or contraction of materials or induced strain in proof mass 204. Such effects can negatively impact the acceleration measurement since these effects may not be distinguished from the true motion, e.g., of basal member 219, housing 229, or fiducial mass 212 of optomechanical accelerometer 200. To overcome thermal variations of proof mass 204, in some embodiments, with reference to FIG. 7, optomechanical accelerometer 200 includes first microscale Fabry-Perot optical cavity 203.1 opposing second microscale Fabry-Perot optical cavity 203.1 to measure cavity length 218 of proof mass 204. By taking the difference of the two measurements of first cavity output light 214.1 and second cavity output light 214.2, thermal effects can be mitigated. Multiple laser wavelengths first excitation radiation 210.1 and second excitation radiation 210.1 can be used to measure first cavity length 218.1 and second cavity length 218.2 respectively of first microscale Fabry-Perot optical cavity 203.1 and second microscale Fabry-Perot optical cavity 203.1 by either using a single fiber optic 223 on one side of proof mass 204 or with two independent fiber optics. In addition to thermal effects, this dual cavity approach can reduce effects of radiation pressure on the noise floor of optomechanical accelerometer 200. Dual cavities 203 can have applications in quantum measurements using optomechanical accelerometer 200, wherein quantum backaction can be mitigated using this configuration of opposing first microscale Fabry-Perot optical cavity 203.1 and second microscale Fabry-Perot optical cavity 203.2.

In an embodiment, with reference to FIG. 7, second microscale Fabry-Perot optical cavity 203.2. is disposed on an opposite side of proof mass 204 relative to first microscale Fabry-Perot optical cavity 203.1 and includes a second fiducial reflective layer 216 disposed on second fiducial mass, 0.2; a second proof reflective layer 217 disposed on proof mass 204 opposing the second fiducial reflective layer 216 and in optical communication with the second fiducial reflective layer 216; second cavity length 218.2, such that the second fiducial reflective layer 216 and the second proof reflective layer 217 oppose one another and are interposed between second fiducial mass 212.2 and proof mass 204 at the second cavity length 218 that changes by an amount of displacement of proof mass 204 in displacement motion 220 relative to the second fiducial mass 212.2, and a second cavity resonance at a second cavity resonance wavelength provided by second cavity length 218.2, such that second microscale Fabry-Perot optical cavity 203.2: receives second excitation radiation 210.2 including a second excitation wavelength and a second excitation light intensity, such that second excitation radiation 210.2 is reflected between the second proof reflective layer 217 and the second fiducial reflective layer 216 as second dynamic cavity light 215.2 when the second excitation wavelength is resonant with the second cavity resonance wavelength; and reflects a portion of second dynamic cavity light 215.2 as second cavity output light 214.2 including a second cavity output light intensity when second dynamic cavity light 215.2 is produced from second excitation radiation 210.2, such that the second cavity output light intensity optically compensates for a change in a size of proof mass 204 that perturbs cavity length 218.

Figure 8:
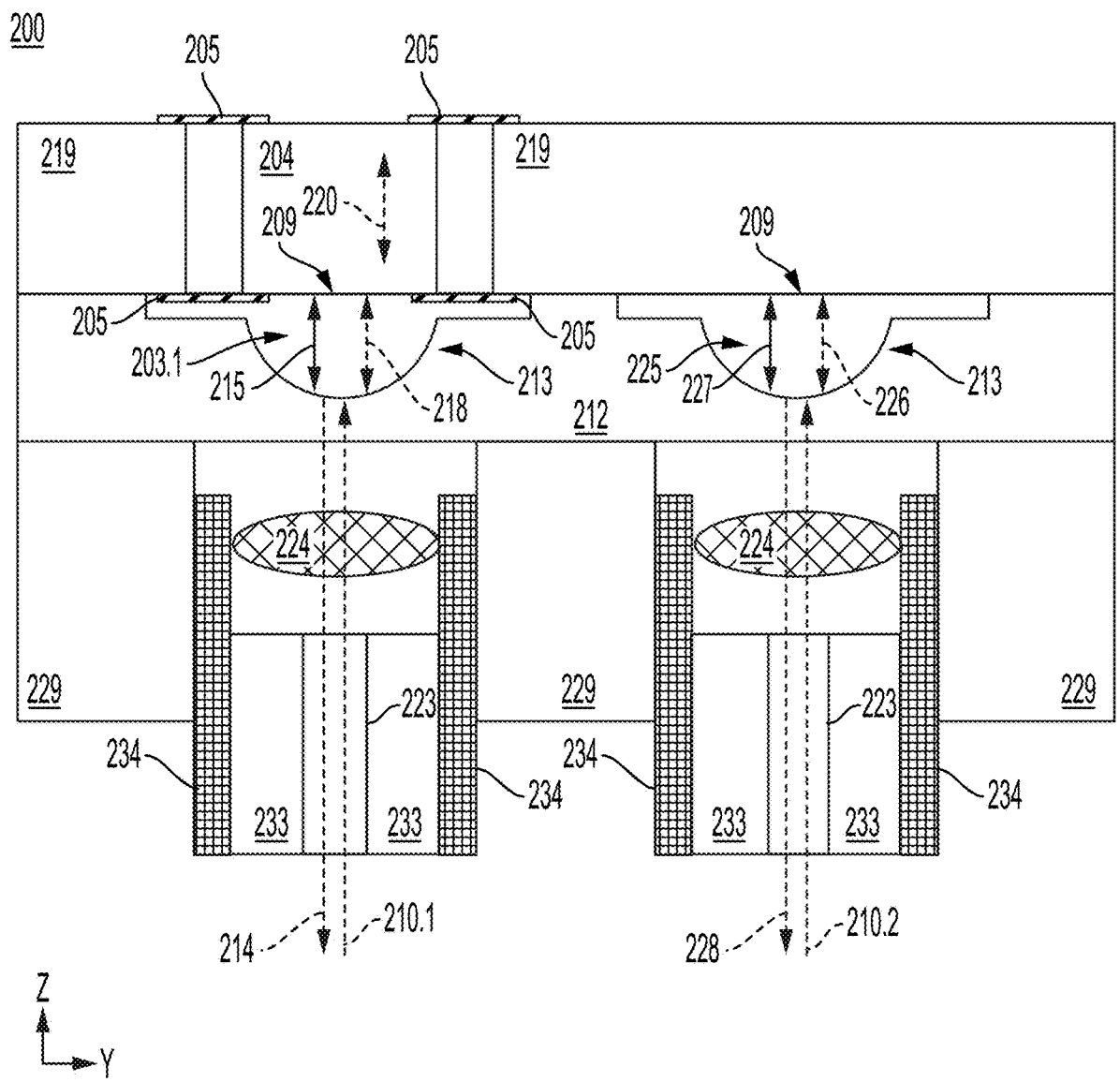
FIG. 8 shows an optomechanical accelerometer with a static optical cavity.

Another approach for compensating for thermal effects is shown in FIG. 8, wherein static optical cavity 225 is laterally arranged in fiducial mass 212 and basal member 219 with respect to proof mass 204 and microscale Fabry-Perot optical cavity 203. It is contemplated that static optical cavity 225 is fabricated in the same device layer as proof mass 204. By measuring changes in static cavity length 226 of static optical cavity 225, a temperature change can be deduced, providing a compensation for removing thermal effects from cavity output light 214 from microscale Fabry-Perot optical cavity 203. Simultaneous acceleration and temperature measurements can be obtained in environments such as on satellites, in an oil drilling operation, or in deep sea exploration. It should be appreciated that microscale Fabry-Perot optical cavity 203 and static optical cavity 225 independently can be spherical, hemispherical, reverse hemispherical, or planar-parallel. Further, dual cavities can be implemented.

In an embodiment, with reference to FIG. 8, optomechanical accelerometer 200 includes static optical cavity 225 that includes: an optically reflective surface disposed on fiducial mass 212; an optically reflective surface disposed on basal member 219 opposing the optically reflective surface disposed on fiducial mass 212 and in communication with the optically reflective surface disposed on fiducial mass 212; static cavity length 226 that includes a static cavity resonance at a static cavity resonance wavelength, such that static optical cavity 225: receives second excitation radiation 210.2 including a second excitation wavelength; when the second excitation wavelength is resonant with the static cavity resonance wavelength, stores some of second excitation radiation 210.2 as static cavity light 227; and transmits a portion of static cavity light 227 as static cavity output light 228 when static cavity light 227 is produced from second excitation radiation 210.2, such that static cavity output light 228 compensates cavity output light 214 for a change in a size of the proof mass 204 that perturbs cavity length 218.

Figure 9:
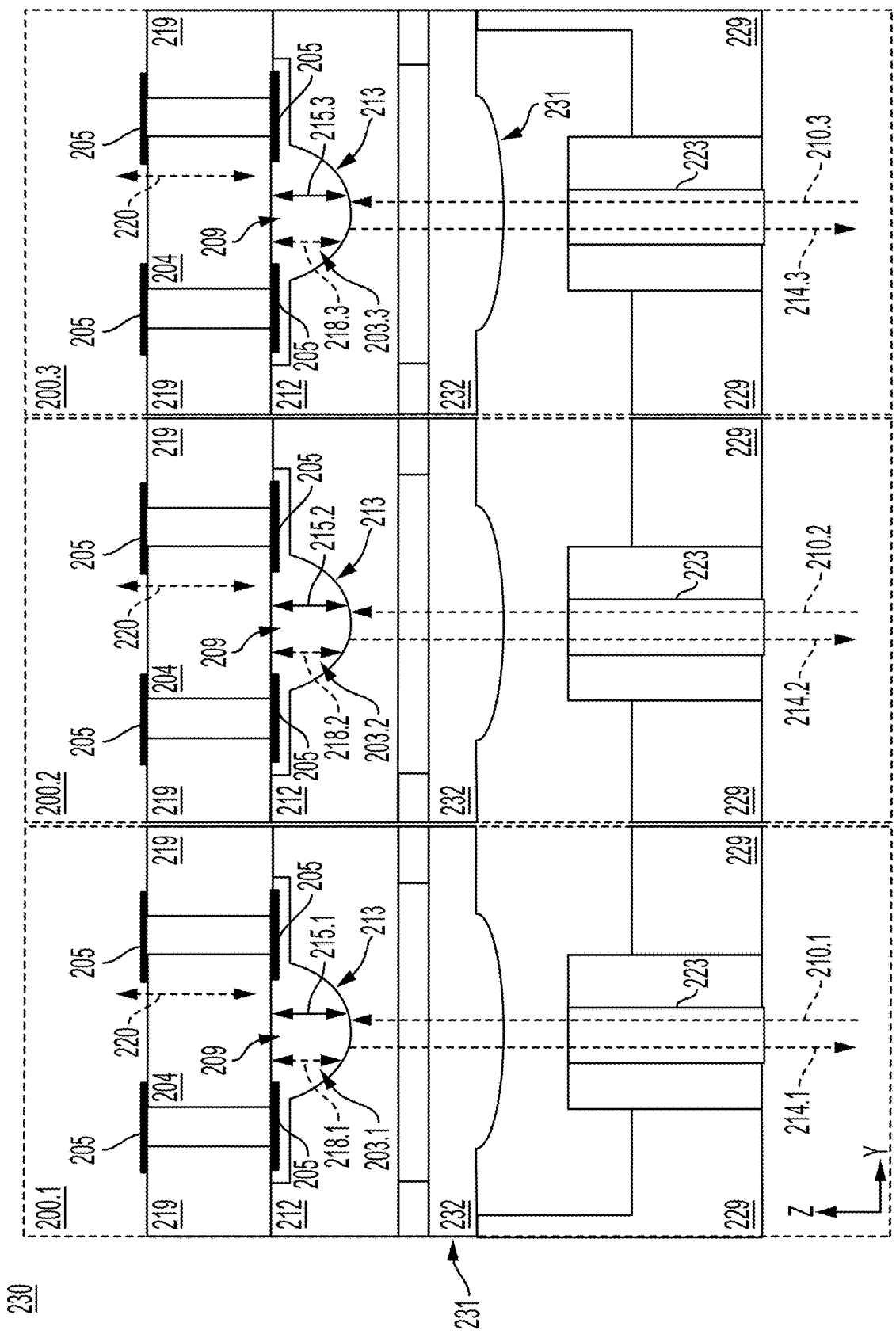
FIG. 9 shows an optomechanical accelerometer array.
Figure 10:
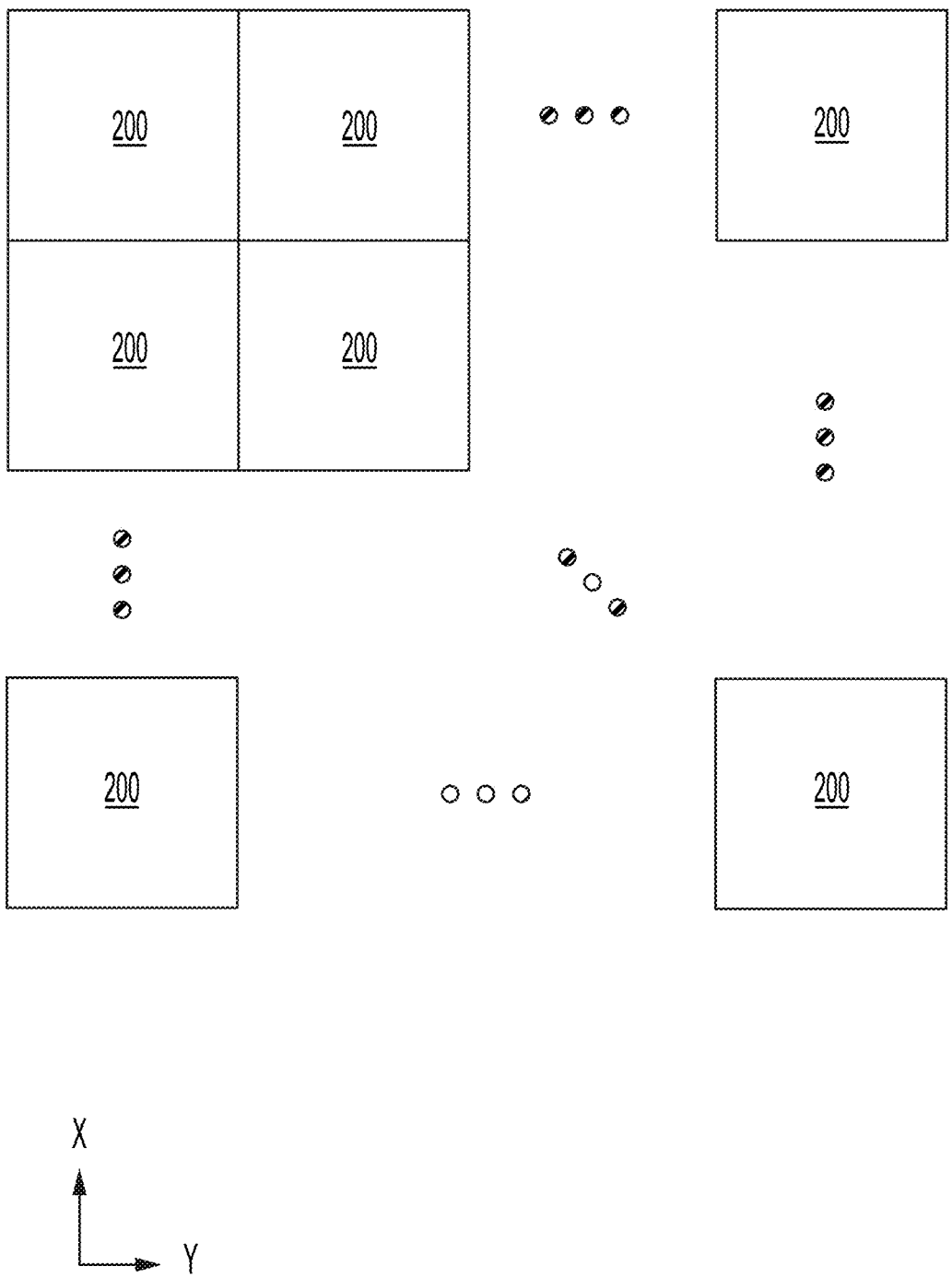
FIG. 10 shows an optomechanical accelerometer array.

With reference to FIG. 9 and FIG. 10, optomechanical accelerometer array 230 can include a plurality of accelerometers 200 in a single package, wherein individual accelerometers 200 can have different bandwidth or sensitivity that can be used, e.g., for applications that require high dynamic range. Optomechanical accelerometer array 230 can include proof masses 204 and concave micromirrors of fiducial mass 212 in multiple microscale Fabry-Perot optical cavities 203 that are optically coupled to lenslet array 231 of lenslets 232 and fiber arrays that include a plurality of fiber optics 223. By integrating multiple optomechanical accelerometers 200 into one chip stack, sensor fusion can combine the output of optomechanical accelerometer array 230 to provide the highest measurement range while maintaining sensitivity. Multiple optomechanical accelerometers 200 in one chip can be used to measure rotation of the sensor package and provide similar information as a gyroscope, enabling gyro-free inertial navigation in an absence of a gyroscope. This approach can reduce the size of a single optomechanical accelerometer 200 by replacing the lensed fiber collimator with a bare optical fiber and integrated microfabricated optics. Lenslet array 231 includes integrated optics, but other designs can be used. Microfabricated three-dimensional lenses or flat metamaterial lenses could be disposed on the chip adjacent to fiber coupling optics to couple excitation radiation 210 into an individual microscale Fabry-Perot optical cavity 203. Individual microscale Fabry-Perot optical cavities 203 independently can be spherical, hemispherical, reverse hemispherical, or planar-parallel. Further, dual cavities can be implemented in one or more cavities 203.

In an embodiment, the concave micromirror, that is one side of the Fabry-Perot cavity, can be replaced with any optical element that provides refocusing of the light in the cavity and that has high reflectivity. For example, a nanofabricated metasurface composed of periodic nanostructures can be used to refocus light back to the proof mass and provide high reflectivity, all on a single flat, patterned surface. Other types of concave micromirrors with different shapes and fabrication methods can be used. Most importantly, this optical element must be capable of creating a stable hemispherical or spherical optical cavity with the proof mass.

In an embodiment, with reference to FIG. 9 and FIG. 10, optomechanical accelerometer array 230 includes a plurality of optomechanical accelerometers 200, wherein individual optomechanical accelerometers 200 are arranged in an array format. Lenslet array 231 can include a plurality of lenses 232, wherein each lenslet 232 is individually disposed in optical communication with one of microscale Fabry-Perot optical cavities 203 of optomechanical accelerometers 200.

Optomechanical accelerometer 200 can be made of various elements and components that are microfabricated, wherein proof mass 204 is a mechanical resonator that is suspended by microscale beams 205 and is disposed within a microfabricated chip. Microscale beam 205 supports proof mass 204 on opposing surfaces, which results in a selected amount of separation between resonance modes. Mode separation makes it possible to model the accelerometer with a single vibrational mode within the frequency range of interest. This allows for simple and direct conversion from a measured displacement of the proof mass to a measured acceleration using the single-mode model, resulting in higher accuracy of the accelerometer due to the simplicity of the model and higher certainty in the model parameters. Instead of beams, the proof mass can also be supported by a continuous membrane on either side. This is equivalent to filling in the spaces between the beams, resulting in a stiffer accelerometer with higher resonance frequencies. On a separate microfabricated chip, a concave micromirror in fiducial mass 212 can be formed. When the chips containing proof mass 204 and fiducial mass 212 are assembled together, they form microscale Fabry-Perot optical cavity 203, wherein opposing surfaces of proof mass 204 and fiducial mass 212 have high reflectivity coatings disposed thereon respectively as proof reflective layer 217 and fiducial reflective layer 216. Motion of the proof mass 204 is measured by using excitation radiation 210 to detect changes in optical resonances of microscale Fabry-Perot optical cavity 203 through communication of cavity output light 214 from microscale Fabry-Perot optical cavity 203. Excitation radiation 210 is coupled into microscale Fabry-Perot optical cavity 203, and at resonance excitation radiation 210 is repeatedly reflected as dynamic cavity light 215 before being communicated out of microscale Fabry-Perot optical cavity 203 as cavity output light 214 by fiber optic 223 and lens 224, wherein the measured optical signal is received in fiber optic 223 as cavity output light 214. Microscale Fabry-Perot optical cavity 203 provides a stable cavity design that can be, e.g., the hemispherical cavity, and high reflectivity coatings are included to provide high optical finesse that results in high displacement sensitivity of proof mass 204 relative to fiducial mass 212. Coatings and materials used for proof mass 204 and fiducial mass 212 can be selected for operation with laser wavelengths for excitation radiation 210, dynamic cavity light 215, and cavity output light 214 that can include visible light from 400 nm to 700 nm, near infrared light from 700 nm to 1000 nm, or short-wave infrared from 1000 nm to 3000 nm. Operation with a laser wavelength near 1550 nm can provide integration with a large number of fiber optic components designed for telecommunications, making optomechanical accelerometer 200 scalable and compatible with off-the-shelf optical characterization tools.

Elements of optomechanical accelerometer 200 can be various sizes. It is contemplated that dynamic cavity light 215 can be selected based on a resonance frequency desired for microscale Fabry-Perot optical cavity 203, which can be varied by a choice of materials included in proof mass 204 and microscale beam 205. Cavity lengths, e.g., cavity length 218 and the like, independently can be from 1 micrometer (μm) to 10 centimeter (cm), specifically from 10 micrometer (mm) to 1 centimeter (cm), and more specifically from 50 micrometer (μm) to 2 millimeter (mm).

Elements of optomechanical accelerometer 200 can be made of a material that is physically or chemically resilient in an environment in which optomechanical accelerometer 200 is disposed. Exemplary materials include a metal, ceramic, thermoplastic, glass, semiconductor, and the like. The elements of optomechanical accelerometer 200 can be made of the same or different material and can be monolithic in a single physical body or can be separate members that are physically joined. In an embodiment, microscale beam 205, fiducial mass 212, and proof mass 204 are made of the same material. In an embodiment, fiducial mass 212, and proof mass 204 are made of the same material. In an embodiment, microscale beam 205 is a different material than fiducial mass 212 and proof mass 204. In an embodiment, microscale beam 205 includes silicon nitride. In an embodiment, fiducial mass 212 and proof mass 204 are made of silicon. Transmission of a selected wavelength of light, e.g., for excitation radiation 210, can be provided by the material of proof mass 204 or fiducial mass 212. For example, transmission of visible light by proof mass 204 or fiducial mass 212 can be provided by fused silica.

The fiducial reflective layer 216 and proof reflective layer 217 can be composed of various structures including dielectric Bragg mirror coatings, metal layers, two-dimensional photonic crystals, and nanostructured meta-surfaces.

Optomechanical accelerometer 200 can be made in various ways. It should be appreciated that optomechanical accelerometer 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, optomechanical accelerometer 200 can be disposed in a terrestrial environment or space environment. Elements of optomechanical accelerometer 200 can be formed from silicon, silicon nitride, and the like although other suitable materials, such ceramic, glass, or metal can be used. In an embodiment, elements of optomechanical accelerometer 200 are selectively etched to remove various different materials using different etchants and photolithographic masks and procedures. The various layers thus formed can be subjected to joining by bonding to form optomechanical accelerometer 200. Microfabrication and nanofabrication methods used for the manufacture of electronics and microelectromechanical systems can be used to produce the optomechanical accelerometer 200. According to an embodiment, the elements of optomechanical accelerometer 200 are formed using 3D printing although the elements of optomechanical accelerometer 200 can be formed using other methods, such as injection molding or machining a stock material such as block of material that is subjected to removal of material such as by cutting, laser ablation, and the like. Accordingly, optomechanical accelerometer 200 can be made by additive or subtractive manufacturing.

Optomechanical accelerometer 200 has numerous advantageous and unexpected benefits and uses. In an embodiment, a process for performing optomechanical accelerometry includes: receiving, by microscale Fabry-Perot optical cavity 203 of optomechanical accelerometer 200, excitation radiation 210 including excitation wavelength from a single-wavelength, stable laser; reflecting, in the microscale Fabry-Perot optical cavity 203, the excitation radiation 210 between the proof reflective layer 217 and the fiducial reflective layer 216 as dynamic cavity light 215 when the excitation wavelength is resonant with the cavity resonance wavelength; transmitting, from the microscale Fabry-Perot optical cavity 203, a portion of the dynamic cavity light 215 as cavity output light 214 including an cavity output light intensity when dynamic cavity light 215 is produced from excitation radiation 210; and determining, from the cavity output light intensity, acceleration of optomechanical accelerometer 200 through mechanical displacement of the proof mass 204 by converting the optical signal to a displacement measurement using an optical cavity readout method, such as side-of-resonance locking, Pound-Drever-Hall locking, center-of-resonance locking, or optical frequency comb readout, to perform optomechanical accelerometry.

Here, the measured displacement of proof mass 204 can be transformed into acceleration using a model of the dynamics of the resonator. In this process, first the optical signal is converted to a displacement measurement. The measured displacement is then converted to a measured acceleration by inverting the equation describing the dynamic response of the proof mass 204 and multiplying this inverted equation by the measured displacement. To minimize the complexity and uncertainty in this conversion process, the proof mass dynamic response can be designed to behave like a simple harmonic oscillator, or a single vibrational mode, over the frequency range of interest. This results in the most efficient conversion process. The combination of an accurate displacement measurement, which is traceable to the laser wavelength of the laser used to interrogate microscale Fabry-Perot optical cavity 203, and the accurate transformation from displacement to acceleration result in acceleration measurement with low uncertainty.

Displacement of proof mass 204 can be measured with microscale Fabry-Perot optical cavity 203 using cavity readout methods including Pound-Drever-Hall laser locking, sideband laser locking, or spectroscopy with optical frequency combs. In an embodiment, displacement is determined by a heterodyne electro-optic frequency combs readout method in which the reflected or transmitted light from the optomechanical accelerometer 200 is interfered with a frequency-shifted frequency comb, resulting in an optical mixdown process. The resulting signal from the photodetector used to measure the interfering light contains radiofrequency signals that can be processed efficiently to determine the displacement of the proof mass 204 in real time.

Optomechanical accelerometer 200 and processes disclosed herein have numerous beneficial uses, including the measurement of high-frequency low-amplitude vibrations, slowly varying, small amplitude accelerations due to rigid body motion, and for accurate measurement of acceleration without the need for calibration. Optomechanical accelerometer 200 is applicable to a number of measurements, including low-level vibration detection used in security and event detection, inertial sensing as used in inertial navigation systems, and seismic measurements for oil and gas exploration.

Advantageously, optomechanical accelerometer 200 overcomes limitations and technical deficiencies of conventional devices and conventional processes such as the requirement for calibration to achieve acceptable measurement uncertainty and the measurement of accelerations that are over a wide bandwidth (>20 kHz) and of small amplitude (<1 $\mu m/s^2$). Further, dual cavity designs overcome limitations of thermal drift by providing effective compensation mechanisms, providing more accurate acceleration measurement over varying temperature. Conventional accelerometers use piezoelectric or piezoresistive materials to measure strain in a mechanical structure when excited with an acceleration, or use capacitive sensing to measure displacement of a proof mass. These conventional methods are not as sensitive as performing optomechanical accelerometry described herein and do not provide a method for internal calibration. Accordingly, optomechanical accelerometer 200 can provide higher precision and accuracy for high-value applications than conventional devices.

Optomechanical accelerometer 200 and processes herein unexpectedly results in intrinsic measurement accuracy at the level of 1% and below without calibration, which cannot be achieved with conventional devices. Moreover, optomechanical accelerometer 200 can be scaled to a wide ranged of problems by adjusting the size of the proof mass 204 and reflectivity of the fiducial reflective layer 216 and proof reflective layer 217. The size of the proof mass has an effect on the bandwidth and resolution of the accelerometer and the reflectivity can change the resolution, where these parameters can be optimized based on the needs of a particular measurement.

The articles and processes herein are illustrated further by the following Example, which is non-limiting.

EXAMPLE

Broadband Thermomechanically Limited Sensing with an Optomechanical Accelerometer Acceleration measurement is used in commercial, scientific, and defense applications, but resolution and accuracy achievable for demanding applications is limited by the conventional technology used to build and calibrate accelerometers. This Example describes an optomechanical accelerometer that includes a microscale Fabry-Perot optical cavity (also referred to herein as a Fabry-Perot microcavity) in a silicon chip that is extremely precise, field deployable, and can self-calibrate. The measured acceleration resolution of the optomechanical accelerometer is the highest reported to date for a microfabricated optomechanical accelerometer and is achieved over a wide frequency range (314 nm·s−2/√Hz over 6.8 kHz). The combination of a single vibrational mode in the mechanical spectrum and the broadband thermally limited resolution enables accurate conversion from sensor displacement to acceleration. This also allows measurement of acceleration directly in terms of the laser wavelength, making it possible for sensors to calibrate internally and serve as intrinsic standards. This sensing platform is applicable to a range of measurements from industrial accelerometry and inertial navigation to gravimetry and fundamental physics.

High-precision, high-bandwidth acceleration measurement is central to many important applications, including inertial navigation, seismometry, and structural health monitoring of buildings and bridges. Conventional electromechanical accelerometers have largely relied on piezoelectric, capacitive, or piezoresistive transduction to convert the displacement of the accelerometer's proof mass to an output voltage when an excitation is applied. However, these transduction methods have reached sensitivity and bandwidth limits that are prohibitive for many applications. As a result, optical accelerometers have long been of interest due to the high precision provided by interferometry. These have included accelerometers assembled from macroscale optics as well as those based on fiber optic interferometers and fiber Bragg grating cavities. Conventional integrated micro- and nanoscale cavities provide displacement resolution in the range of 1 fm/√Hz1 fm/√Hz and below due to their low optical loss, which can result in an acceleration resolution on the order of 1 $\mu m \cdot s^{-2}/\sqrt{Hz}$ and below for acceleration frequencies up to 10 kHz or more.

In addition to high resolution, optomechanical accelerometers promise greater accuracy without the need for calibration because the displacement of the proof mass can be measured directly in terms of the laser wavelength, an accepted practical realization of the meter, rather than electrical quantities. To determine the acceleration acting on the sensor from the displacement of its proof mass, the device physics must be accurately known. Therefore, the accelerometer must have a simple, deterministic mechanical response so that the dynamic model can be accurately inverted to convert displacement to acceleration. The thermomechanical noise of the accelerometer should exceed the other fundamental noise source, optical shot noise in the displacement measurement, so that the mechanical response can be identified with high fidelity and the acceleration noise floor will be flat over a wide frequency range.

Conventional mechanical mode structure may be too complex and difficult to identify to allow reliable, broadband conversion between displacement and acceleration, or shot noise has dominated over most of the bandwidth of the accelerometer, or both, thereby preventing broadband measurement. This Example describes a microfabricated optomechanical accelerometer that reaches the thermodynamic resolution limit over a broad frequency range (314 nm·s−2/√Hz over 6.8 kHz), greatly exceeding the resolution and bandwidth found in conventional accelerometers. Broadband measurement is for detection of general time-varying signals at the thermodynamic limit, as well as rigorous understanding of the device physics required for advanced applications. In addition, the devices reported here are fully packaged, field-deployable, scalable, operable in air and vacuum—and achieve the highest acceleration resolution reported to date for a microfabricated optomechanical accelerometer. The optomechanical accelerometer measures acceleration for vibration measurement and can be applied to inertial sensing, seismometry, and gravimetry. In addition, the optomechanical accelerometer is applicable to many other applied and fundamental physical measurements. For example, optomechanical detection with the optomechanical accelerometer can be applied to dark matter detection.

Figure 11:
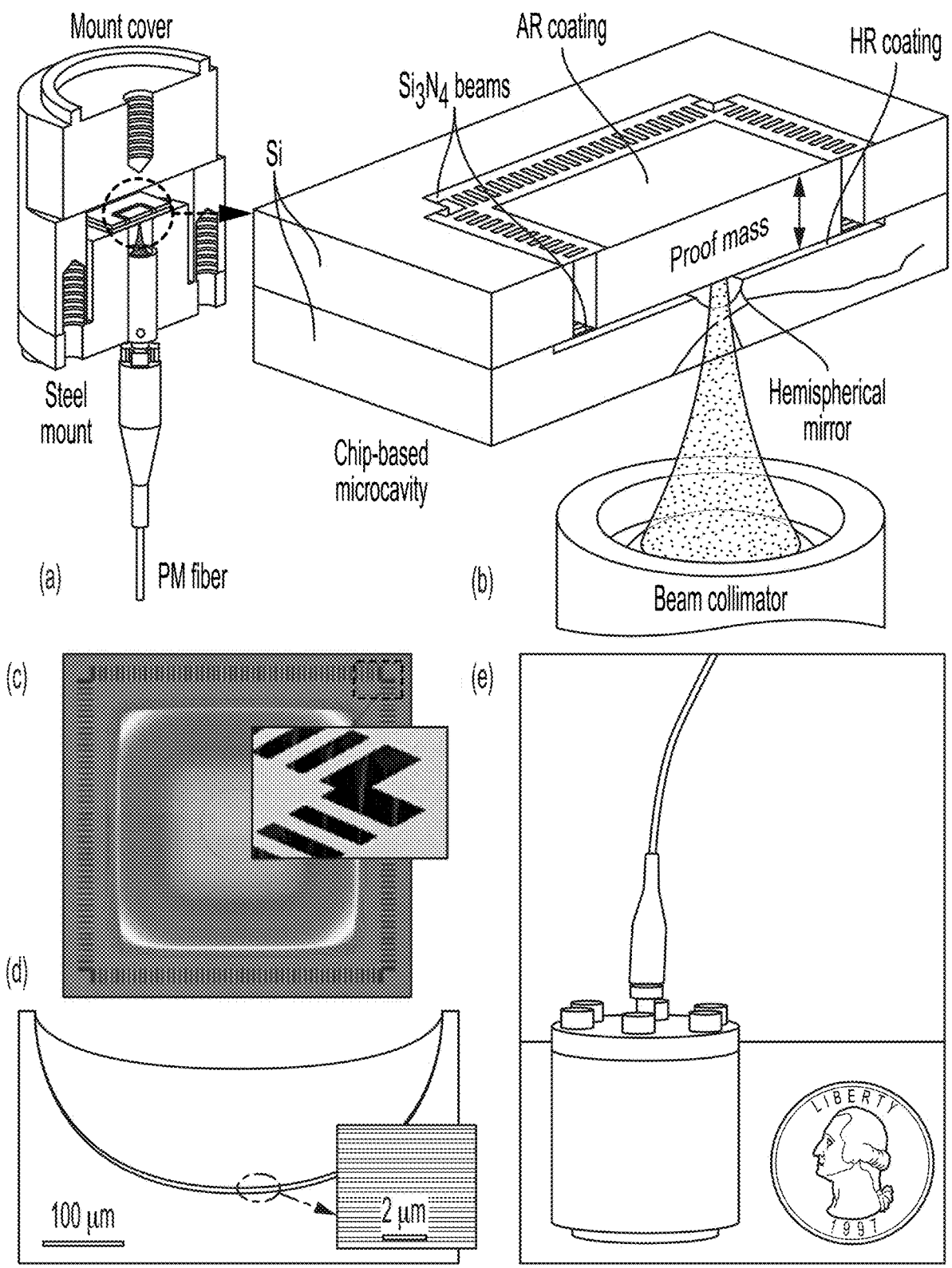
FIG. 11 shows an optomechanical accelerometer design according to the Example. (a) Cross section of the optomechanical accelerometer, including microfabricated cavity optomechanical components, polarization maintaining (PM) fiber optics, and a stainless-steel package. (b) Cross section of the two microfabricated chips. (c) Stitched optical micrograph of the mechanical resonator showing the high-reflectivity mirror coating restricted to the proof mass in order to avoid fouling the microbeams. Inset: Scanning electron micrograph of the silicon nitride microbeams. (d) Scanning electron micrograph of a cleaved concave silicon micromirror. Inset: Close-up of the high-reflectivity mirror coating with quarter-wave periodicity. (e) Image of a packaged and fiber-coupled accelerometer.

An optomechanical accelerometer is shown in FIG. 11. Two silicon microfabricated chips are sensing elements of the optomechanical accelerometer. One chip contains a millimeter-scale silicon proof mass suspended on both sides by silicon nitride ($Si_3N_4$) microbeams, and the other chip has a concave silicon micromirror. Both optical elements have patterned dielectric mirror and antireflective coatings. A hemispherical Fabry-Perot cavity is formed by assembling the chips such that the displacement of the mechanical resonator relative to the concave micromirror can be measured with high precision by interrogating one of the cavity's optical resonances [FIG. 11(b)]. When an acceleration is applied to the accelerometer package, the mechanical resonator displaces relative to the concave micromirror, which is measured as an intensity change in the light reflected from the cavity and converted to a measured acceleration.

The concave micromirror is fabricated in single crystal silicon using a wet etching process, resulting in high-quality mirrors with radii of curvature of approximately 410 μm, a depth of 257 μm, and a surface roughness of 1 nm RMS. The mechanical resonator is composed of a single-crystal silicon proof mass that is constrained on both sides by 1.5 μm thick silicon nitride beams [FIG. 11(c)]. This design provides nearly ideal piston-like displacement in response to an acceleration perpendicular to the chip's surface and provides large frequency separation between the piston mode and higher-order modes. In addition, this design provides low cross-axis sensitivity because the in-plane stiffness of the resonator is 1700 times larger than that along the optical axis based on finite element analysis.

Two optomechanical accelerometer (referred to as Device A and Device B) were tested, which are only principally different in the dimensions of the proof mass and silicon nitride beams as well as the packaging. Device A has a 3 mm×3 mm×0.525 mm proof mass; beams that are 20 μm wide, 92 μm long, and spaced by 20 μm; a resonant frequency of 9.86 kHz; a mass of approximately 11 mg; and it is packaged as shown in FIG. 11(e). Device B is a bare device mounted without a cover for vacuum compatibility and has a 4 mm×4 mm×0.525 mm proof mass; beams that are 20 μm wide, 84 μm long, and spaced by 20 μm; a resonant frequency of 8.74 kHz; and a mass of approximately 20 mg. This sensor design can be extended to a range of measurements such as force, pressure, seismology, and gravimetry by simply modifying the mechanical resonator to have the appropriate mass, stiffness, and damping properties for the given application.

The concave silicon micromirror was fabricated using a slow isotropic wet etching process on a double-side polished, 525 μm thick silicon wafer. First, a 35 μm deep recess was etched using deep reactive ion etching (DRIE), providing space between the moving proof mass and micromirror when assembled. Then the wafer was coated with stoichiometric silicon nitride (300 nm thick) using low-pressure chemical vapor deposition (LPCVD), which serves as a hard mask during wet etching. Circular apertures 300 μm in diameter were patterned in the silicon nitride layer using reactive ion etching (RIE). The wafer was then etched in a mixture of hydrofluoric, nitric, and acetic acids (HNA, 9:75:30 ratio) at room temperature for a predetermined time to achieve the desired depth and radius of curvature, which are approximately 257 μm and 410 μm, respectively, in the presented accelerometers.

The proof mass 204, also referred to as the mechanical resonator, was fabricated on a double-side polished, 525 μm thick silicon wafer by patterning both sides of the wafer identically. A 1.5 µm thick, low-stress silicon nitride layer was deposited on the wafer using LPCVD. The proof mass and beam geometry were patterned with optical lithography, and the silicon nitride was etched with RIE. DRIE was then used to etch the beam pattern through the silicon wafer from both sides in subsequent etch steps. After dicing into 1 cm chips, the beams and proof mass were released by undercutting the silicon nitride beams using KOH with a concentration of 30% at 60° C. The anisotropic etch results in a uniform, faceted sidewall on the proof mass that is self-limiting due to the etch resistance of the ⟨111⟩ crystal planes, providing repeatable dimensions for the proof mass.

Dielectric mirror and antireflection coatings with alternating tantalum pentoxide and silicon dioxide layers were applied to the concave micromirrors and mechanical resonators using ion beam sputtering [FIG. 11(d)]. A shadow mask made from an etched silicon wafer was used to selectively deposit the coatings on the proof mass and concave mirror. A pair of the completed chips were aligned and bonded with UV curable adhesive. This is a self-aligned process that requires no adjustment of angle or translation beyond ensuring overlap of the concave micromirror and proof mass. Finally, the chip assembly was aligned to a polarization maintaining fiber collimator within the accelerometer package and bonded using UV curable adhesive [FIG. 11(a)]. Antireflection coatings on the focusing lens and the back of the proof mass are used to reduce parasitic reflections.

The optical spectrum of the hemispherical cavity was measured in both transmission and reflection as shown for wavelengths near 1550 nm in FIG. 12(a), where the free spectral range (FSR) is 400 GHz (3.21 nm), and higher-order transverse modes can be seen between the dominant fundamental modes. These modes were imaged in transmission on an InGaAs camera, showing intensity profiles characteristic of highly symmetric spatial modes. Modes grouped in columns have similar resonance wavelengths but are not degenerate. Displacement measurements of the mechanical resonator were performed in reflection using a fundamental cavity mode (TEM00) near a wavelength of 1551 nm with a linewidth of $\Gamma$=73.7 MHz (FWHM), a finesse of F=5430, and a mirror reflectivity of R=99.89% as shown in FIG. 12(b). The selection of F was based on the trade-off between sensitivity and dynamic range for measurement with a side-locked laser.

The readout method used for small-amplitude displacement measurement of the optical cavity is shown in FIG. 13(a). A stable fiber laser (FL) with a short-term linewidth near 100 Hz is phase modulated using an electro-optic modulator (EOM), which is driven near 3 GHz to generate sidebands. One sideband is locked to the cavity at the maximum slope point on the side of the optical resonance. Side-locking is achieved with a low bandwidth proportional-integral-derivative (PID) controller (≈300 Hz≈300 Hz). Slow changes in cavity length, largely due to thermal- or humidity-induced drift of the cavity length, are tracked by the laser wavelength, while faster motion of the mechanical resonator generates intensity fluctuations that are used to detect acceleration. The incident optical power is 350 µW, which is expected to displace the proof mass by roughly 100 fm on resonance due to radiation pressure. Though a measurable displacement, this does not affect the results reported here. A static displacement does not change the response function of the accelerometer, which depends only on the resonant frequency and damping.

To suppress laser intensity noise, a balanced detection scheme with a bandwidth near 1 MHz was used. The resulting signal from the balanced detector was digitized using a 12-bit spectrum analyzer with a bandwidth of 28 kHz. This approach was used for the sensing resolution measurements due to the superior broadband noise performance of the FL. In addition, a widely tunable external cavity diode laser (ECDL) was used in place of the FL for certain measurements due to its wider wavelength tuning range and resulting ability to easily tune to a desired cavity mode under rapidly varying measurement conditions. For both lasers, the reflected intensity fluctuations for the side-locked cavity result in a detector voltage $\Delta V \Delta V$ that is converted to displacement $\Delta L$ using the relation $\Delta L = L \Delta V / (\lambda S)$, where L is the nominal cavity length, $\lambda$ is the nominal cavity resonance wavelength, and $S = dV/d\lambda$ is the slope of the optical resonance at the lock point.

Figure 13:
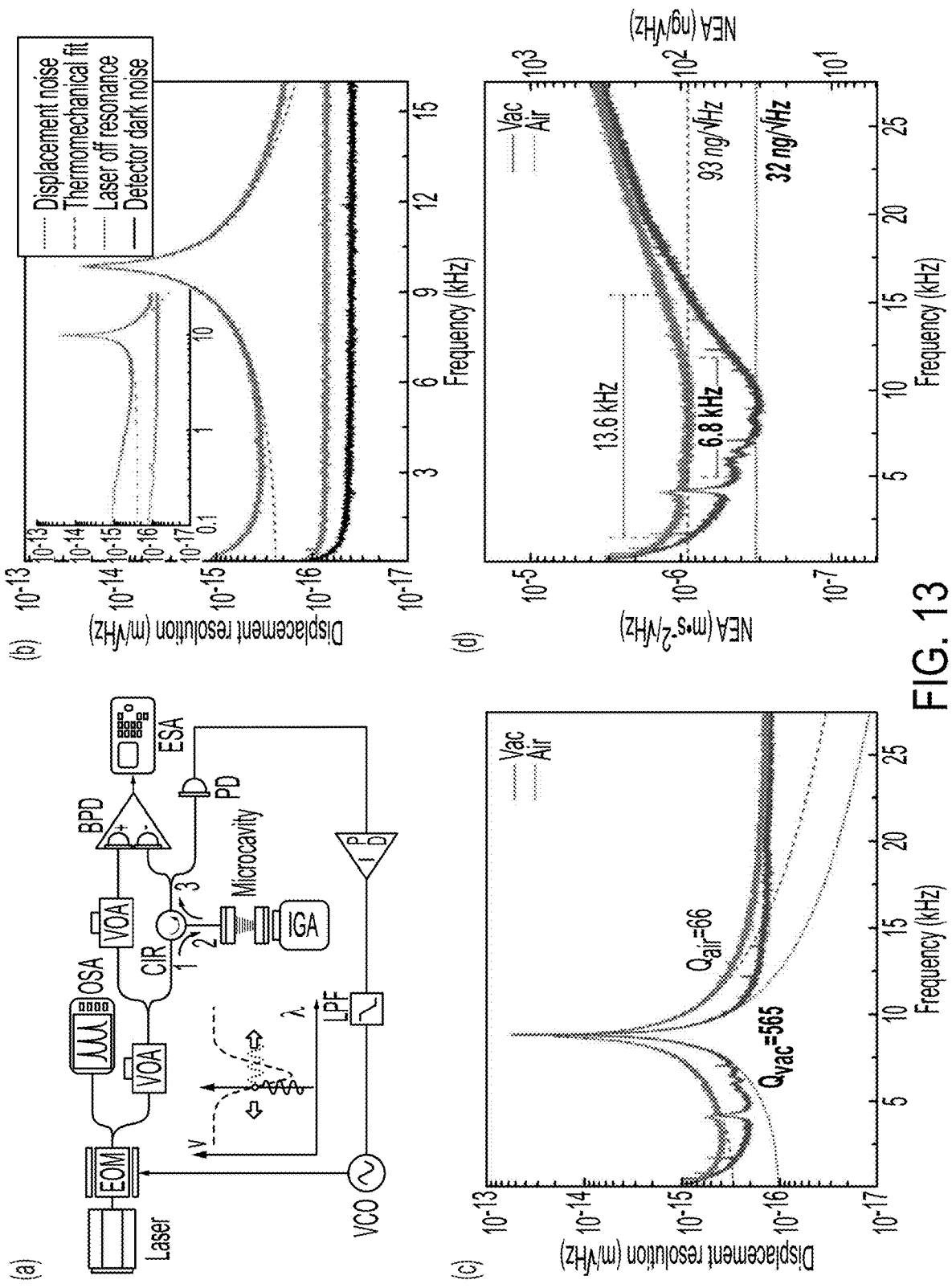
FIG. 13 shows displacement spectral densities and the noise equivalent acceleration according to the Example. (a) Diagram of the optical cavity readout method used to measure the noise performance of the accelerometer. EOM, electro-optic phase modulator; VOA, variable optical attenuator; OSA, optical spectrum analyzer; VCO, voltage-controlled oscillator; CIR, circulator; BPD, balanced photodetector; ESA, electronic spectrum analyzer; IGA, InGaAs camera; PD, photodetector; LPF, low-pass filter; and PID, proportional-integral-derivative controller. (b) Displacement spectral density for the accelerometer in air. Dashed line: Fit to the thermomechanical noise model. Gray line: Shot noise when the laser sideband is completely detuned from the optical resonance. Black line: Photodetector dark noise. Inset: Log-log plot of displacement spectral density. (c) Comparison between operation in air and in vacuum. Dashed lines: Respective fits to the thermomechanical noise model. (d) Noise equivalent acceleration (NEA). Indicated frequency bands represent the range over which the NEA is within 3 dB of the acceleration thermomechanical noise limit (dashed lines)

The displacement noise floor was measured in air and in a vacuum chamber (P=133 mPa) at room temperature, while the accelerometer was acoustically and vibrationally isolated. The resulting displacement spectral density in air for Device A is shown in FIG. 13 (b), where a single vibrational mode is present between 100 Hz and 28 kHz and is driven purely by thermomechanical noise. This is the first demonstration reported of an optomechanical accelerometer operating with a single vibrational mode over such a wide bandwidth. A pure single-mode response is important for the accurate determination of the acceleration acting on the sensor from the displacement of its proof mass using first principles. The presence of additional modes and antiresonances between modes would increase the complexity of the model fit from the thermomechanical noise response. In addition, antiresonances are generally not visible in the thermomechanical noise response. Both of these issues can result in significant inaccuracy in the conversion from displacement to acceleration with a multimode model.

A fit of the displacement spectral density to the expected thermomechanical noise response for a simple harmonic oscillator with viscous damping shows close agreement in FIG. 13(b), allowing precise estimates of the resonance frequency $\omega_0 = 2\pi \times 9.852(16)$ kHz, quality factor Q=99(2), and mass m=10.8(9)mg. This mass estimate derived from the thermomechanical fit is well within the uncertainty of the value of 11.07(53) mg calculated from the dimensions of the silicon resonator and optical coatings. The noise floor at the lowest frequencies is set by readout noise that is likely due to laser frequency noise, phase modulation noise from the EOM, or thermal effects. Well above resonance, approaching 28 kHz, the noise floor closely approaches the optical shot noise limit. Importantly, the displacement resolution is limited by thermomechanical noise over most of the measured frequency range. This was achieved by optimizing the optical (L,F) and mechanical (m,Q,$\omega_0$) parameters so that the thermomechanical noise is above or equal to the shot noise within the bandwidth of interest. One benefit of being broadband limited by thermomechanical noise is that the harmonic oscillator model fit can be very accurate due to a high signal-to-noise ratio, which provides greater precision when converting from proof mass displacement to acceleration.

Comparing the displacement spectral density in air and vacuum for Device B in FIG. 13 (c), the increased Q in vacuum, due to a reduction in gas damping, results in larger thermomechanical noise on resonance and less away from resonance, as expected. However, due to the balance between the thermomechanical noise and shot noise, the frequency range over which the spectral density is thermomechanically limited is clearly reduced. The displacement spectral densities in FIG. 13(c) are converted to a noise equivalent acceleration (NEA) by dividing the response by the harmonic oscillator transfer function as shown in FIG. 13(d). As expected, the NEA reaches the acceleration thermo-mechanical limit, which is independent of frequency ($\Delta_{th}=\sqrt{(4\ kBT\omega 0/Mq)}$), wherever the displacement spectral density is limited by thermomechanical noise. Fluctuations are reduced when the damping is lower, providing a lower thermodynamic limit but making it more difficult to reach since the shot noise must be lower than the thermomechanical noise. Due to increased damping in air, the minimum NEA is higher, 912 nm·s$^{-2}$/√Hz (93 ngn/√Hz, 1 gn=9.81 m·s$^{-2}$), than in vacuum, 314 nm·s$^{-2}$/√Hz (32 ngn/√Hz). The resolution in vacuum represents the lowest value reported— by 2 orders of magnitude—for a microfabricated optomechanical accelerometer with equivalent bandwidth. The achieved resolution is significant in this class of device because microfabrication enables scalable fabrication and embedded devices. The bandwidth over which the NEA is within 3 dB of the acceleration thermomechanical limit is 13.6 kHz and 6.8 kHz for air and vacuum, respectively. This wide range is made possible by the exceptionally low displacement readout noise. Furthermore, the NEA only varies by 1 order of magnitude over the frequency range, which is an improvement of 2 to 4 orders of magnitude compared to previously reported optomechanical accelerometers. This reasonably flat NEA is important for making high-precision broadband acceleration measurements since it provides a consistent signal-to-noise ratio over the measurement bandwidth.

As a test of sensing performance for a range of external acceleration frequencies, the optomechanical accelerometer was placed on a piezoelectric shaker table, and the accelerometer output was compared with the motion measured with a homodyne Michelson interferometer [see FIG. 14(a)]. The frequency of the sinusoidal acceleration generated by the shaker was swept from 1 to 20 kHz. The interferometer was used to measure the displacement of the accelerometer package, which has a 5 mm square gold-on-silicon mirror bonded to it. The resulting displacement amplitude as a function of drive frequency for Device A is shown in FIG. 14(b), where the displacement of the proof mass and package are different because the accelerometer response includes the resonance of the proof mass (9.86 kHz) and the first resonance of the shaker (12.68 kHz), whereas the external interferometer can only detect the shaker resonance. The inset shows that the shaker linearity is better than 1.3%. In addition to the large resonances, much smaller structures in the accelerometer displacement data can be seen at 3.9 kHz and 11.6 kHz. They have been linked to the accelerometer packaging and the shaker itself and are dependent on the torque used in mounting the accelerometer onto the shaker.

Figure 14:
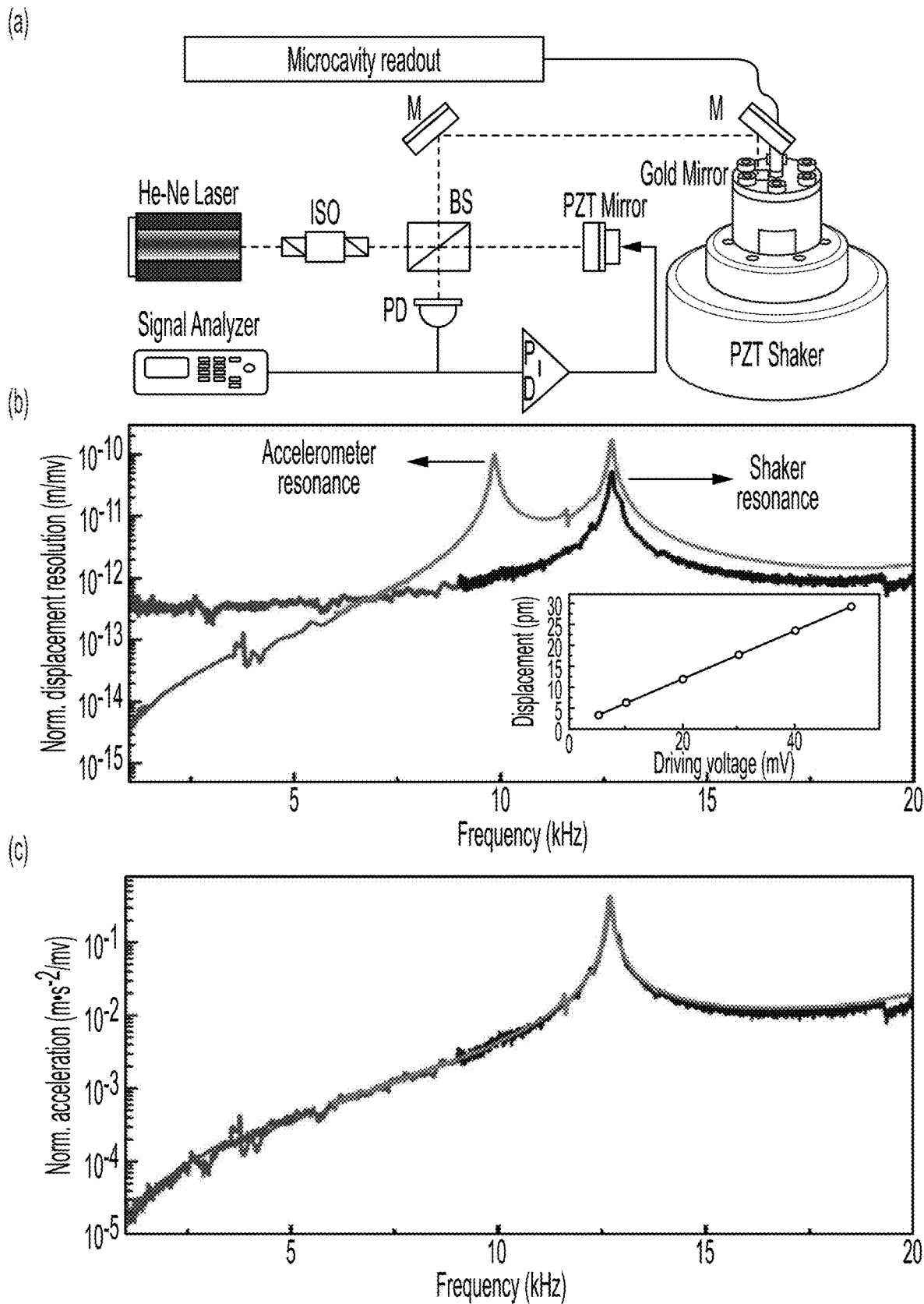
FIG. 14 shows shaker table testing of the accelerometer according to the Example. (a) Experimental configuration for the shaker table tests. M, mirror; PD, photodetector; BS, nonpolarizing beam splitter; ISO, optical isolator; and PID, proportional-integral-derivative servo loop. (b) Comparison of the normalized displacement measured with the accelerometer and interferometer. (c) Comparison of the normalized acceleration measured by the accelerometer and interferometer. The displacement resolution of the accelerometer is more than 100 times greater than that of the interferometer (0.1 fm/√Hz and 60 fm/√Hz, respectively). As a result, different drive voltages were used, 0.1 mV (blue) and 25 mV (red) for the accelerometer and 5 mV (navy) and 30 mV (green) for the interferometer, respectively. The shaker was found to be highly linear for this drive voltage range.

The displacement data from the accelerometer was converted to acceleration, and the interferometer displacement data was transformed to acceleration by multiplying by (2πfd)$^2$, where fd is the drive frequency. Each data set is normalized by the shaker table drive voltage. As shown in FIG. 14 (c), there is close agreement between the accelerometer and interferometer throughout the entire 20 kHz bandwidth. The maximum amplitude of acceleration measured in this case is slightly less than 0.1 m/s$^2$.

The accelerometer's fundamental resonance does not appear in the acceleration data due to the model inversion, demonstrating that measurement on and even above resonance can be effective for these single-mode devices. The percent deviation of the accelerometer from the interferometer was calculated at each measurement frequency. The standard deviation of this value over the entire frequency range is 15.9% and between 4.5 and 11 kHz it is 9.7% after applying a moving average filter to the interferometer data to reduce noise. This comparison confirms that the accelerometer is behaving like a harmonic oscillator (i.e., exhibiting a single, one-dimensional, viscously damped piston mode of the proof mass) and is effective for broadband acceleration measurements. This represents the widest bandwidth demonstrated to date at this error level using a first-principles description based on a single-degree-of-freedom oscillator model. However, this comparison does not accurately indicate the accelerometer performance, as the deviation is dominated by the mechanics of the external reference interferometer and its interaction with the shaker table.

The optomechanical accelerometer is a compact, microfabricated apparatus that provides the thermodynamic limit of resolution over a frequency range greater than 13 kHz, including on, above, and below resonance. Microfabrication enables scalable fabrication and embedded applications, while the highly ideal single-mode structure enables accurate inversion of the mechanical response for accurate measurement. Additionally, broadband measurement at the thermodynamic limit yields a detection resolution nearly independent of frequency, so resonant enhancement is not necessary for detection of weak signals and detection even above resonance is possible with the same noise-equivalent resolution despite a rapidly falling response. The compact size of the sensor enables high-precision measurements outside of laboratory settings, and the optomechanical sensing platform is widely applicable to measurements beyond acceleration, such as force, pressure, and gravity sensing, through straightforward modification of the mechanical resonator.

A benefit of the optomechanical accelerometer is that its dynamic response closely follows that of a one-dimensional viscously-damped harmonic oscillator to convert from measured proof mass displacement to an equivalent acceleration using a low-order model. The harmonic oscillator model can be used to convert between displacement and acceleration.

Figure 15:
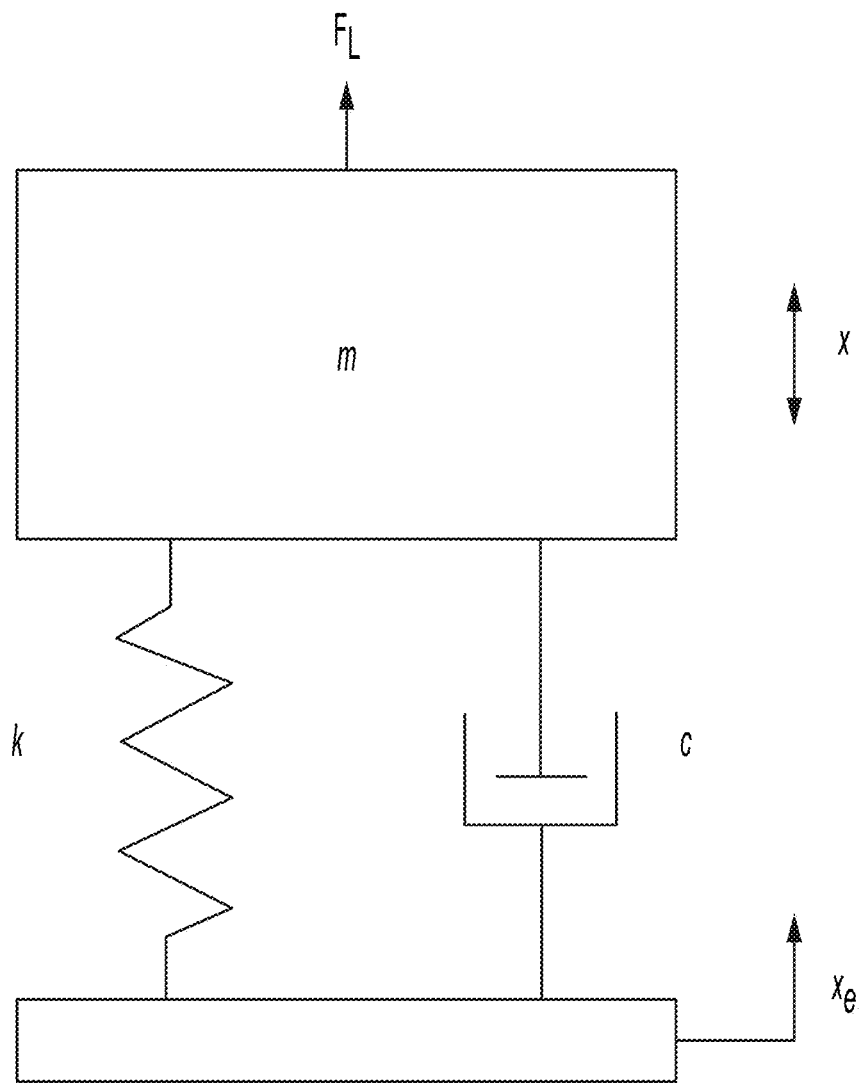
FIG. 15 shows a harmonic oscillator model according to the Example for a mass-spring-damper system. m: mass, k: spring stiffness, c: damping coefficient, x: proof mass displacement, $x_e$: base displacement, $F_L$: Langevin force.

The harmonic oscillator model is shown in FIG. 15, where a mass-spring-damper system is driven by a base excitation, $x_e$. A stochastic force, $F_L$, is also applied to the harmonic oscillator, which results in Brownian motion, generating thermomechanical displacement noise. The oscillator can be described by the following Langevin equation $$m\ddot{x}+c(\dot{x}-\dot{x}_e)+k(x-x_e)=F_L \qquad (1)$$

wherein m is the mass, k is the spring stiffness, c is the damping coefficient, and x is the displacement of the mass. Defining the change in optical cavity length, $x_c$, as $x_c=x-x_e$ and the base acceleration, $a_e$, as $a_e=\ddot{x}_e$ results in the model of interest:

$$\ddot{x}_c + \frac{\omega_0}{Q}\dot{x}_c + \omega_0^2 x_c = -a_e + \frac{F_L}{m} \qquad (2)$$

wherein $\omega_0=\sqrt{k/m}, \omega_0=2\pi f_0$, $f_0$ is the resonance frequency in the absence of damping, $Q=m\omega_0/c$, and Q is the quality factor.

The relationship between cavity displacement, xc, and base acceleration, $a_e$, as a function of frequency, ω, can be determined from eq. (2) by neglecting the Langevin force, FL.

$$x_c(\omega) = \frac{-1}{\omega_0^2 - \omega^2 - i\frac{\omega_0 \omega}{Q}} a_e(\omega) = G(i\omega)a_e(\omega) \quad (3)$$

The amplitude of $a_e$ can then be written as $$|a_e(\omega)| = |G(i\omega)|^{-1}|x_c(\omega)|, \quad (4)$$

which has been used to calculate the acceleration data in FIGS. 3d and 4d in the article from displacement measurements. Implementing eq. (4) requires measurement of $\omega_0$ and Q. Here, this was done by applying a least-squares fit of $G(i\omega)$ to the data in FIGS. 13b and 13c.

The stochastic force in the Langevin equation, eq. (1), is $F_L = \sqrt{4k_B T_c} \Gamma(t)$, wherein $k_B$ is Boltzmann's constant, T is temperature, and $\Gamma(t)$ is a Gaussian white noise process with a standard deviation of 1. Returning to eq. (2), ignoring $a_e$, and taking the power spectral density of $x_c$, defined as $S_{xx}$, results in $$S_{xx}(\omega) = |G(i\omega)|^2 \frac{4k_B T \omega_0}{mQ} \quad (5)$$

The thermomechanical noise in terms of displacement is then defined as $x_{th} = S_{xx}(\omega)^{1/2}$ $$x_{th}(\omega) = |G(i\omega)| \sqrt{\frac{4k_B T \omega_0}{mQ}}. \quad (6)$$

Recalling the conversion from displacement to acceleration, eq. (4), the equivalent acceleration due to thermomechanical noise is then $$a_{th} = \sqrt{\frac{4k_B T \omega_0}{mQ}}. \quad (7)$$

Interestingly, $a_{th}$ is only a function of the resonator parameters ($\omega_0$, m, and Q) and temperature, and not a function of frequency, meaning that the thermomechanical noise floor in terms of acceleration is flat. In addition to thermomechanical noise, optical shot noise is the other fundamentally limiting noise source. The power spectral density of the optical shot noise is $S_{pp} = h\nu P_a/\eta$, where h is Planck's constant, ν is the optical frequency of the laser, $P_a$ is the average power reaching the photodetector, and η is the quantum efficiency of the photodetector. This can be converted to shot noise in terms of displacement using $$x_S = g_{x/\nu} g_{V/i} R S_{pp}^{1/2} = g_{x/\nu} g_{V/i} R \sqrt{2h\nu P_a/\eta} \quad (8)$$

Figure 16:
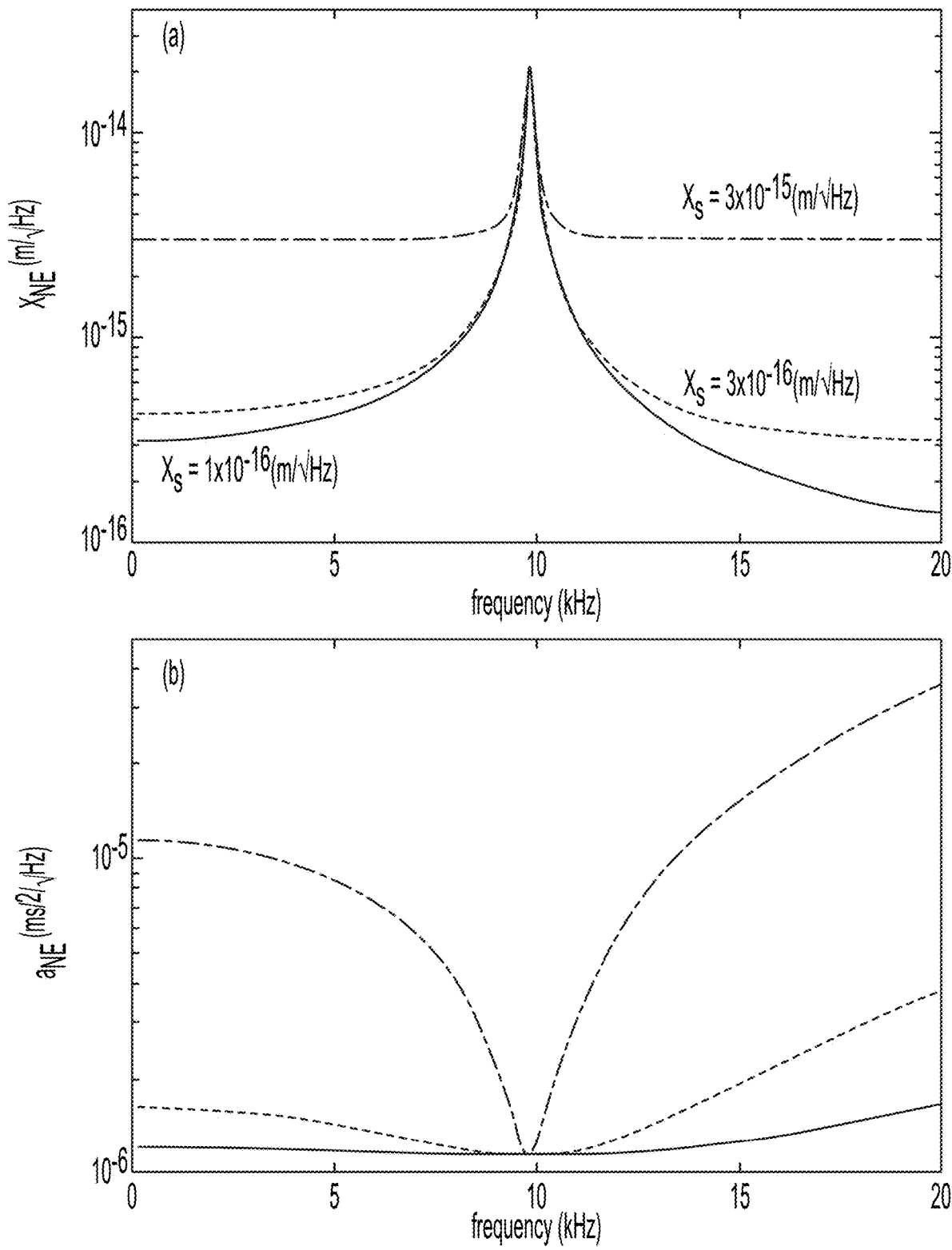
FIG. 16 shows noise equivalent displacement and acceleration for varying optical shot noise level according to the Example. (a) Noise equivalent displacement combining thermomechanical noise and optical shot noise at three different shot noise levels. $\omega_0=2\pi$ (9.8 kHz), Q=70, m=11 mg, T=293 K. (b) Noise equivalent acceleration based on the displacement noise in (a)

Since the thermomechanical noise and shot noise are uncorrelated, they can be summed in quadrature to get the total noise equivalent displacement, $x_{NE}$, and acceleration, $a_{NE}$. Unlike the thermomechanical displacement noise, $x_{th}$, the optical shot noise does not represent real resonator motion but rather, it is detection noise that is analytically referred to either displacement or acceleration. As a result, the best-case scenario for a resonator with fixed parameters ($\omega_0$, Q, m, T) is for the optical shot noise to be lower than the thermomechanical noise. In this situation, the optical readout will measure the motion of the resonator with minimal contribution from shot noise. This is shown in FIG. 16, where the calculated noise floor is presented for a resonator with parameters similar to those described in the experiments in the article. Three different levels of shot noise are shown, where two are above the thermomechanical noise and one is below. When the shot noise is below the thermomechanical noise, the resonance shape is observed over the entire frequency range, which provide better estimates of $\omega_0$ and Q when fitting displacement noise spectra to the harmonic oscillator model. After converting the displacement to acceleration, as shown in FIG. 16b, the importance of reducing the shot noise is readily apparent. The noise equivalent acceleration is nearly flat over the frequency range when the shot noise is below the thermomechanical noise. Achieving a flat noise floor in acceleration is critical for a broadband accelerometer because it enables the measurement of signals with widely varying frequencies at the same precision level. For example, if the acceleration is a square wave, all of the harmonics within the bandwidth of the sensor will be measured with the same precision when the noise floor is flat, which means that the signal can be accurately reconstructed from the data. If the noise floor is frequency dependent, this reconstruction would be less accurate since the signal-to-noise ratio will vary across the frequency range.

Figure 17:
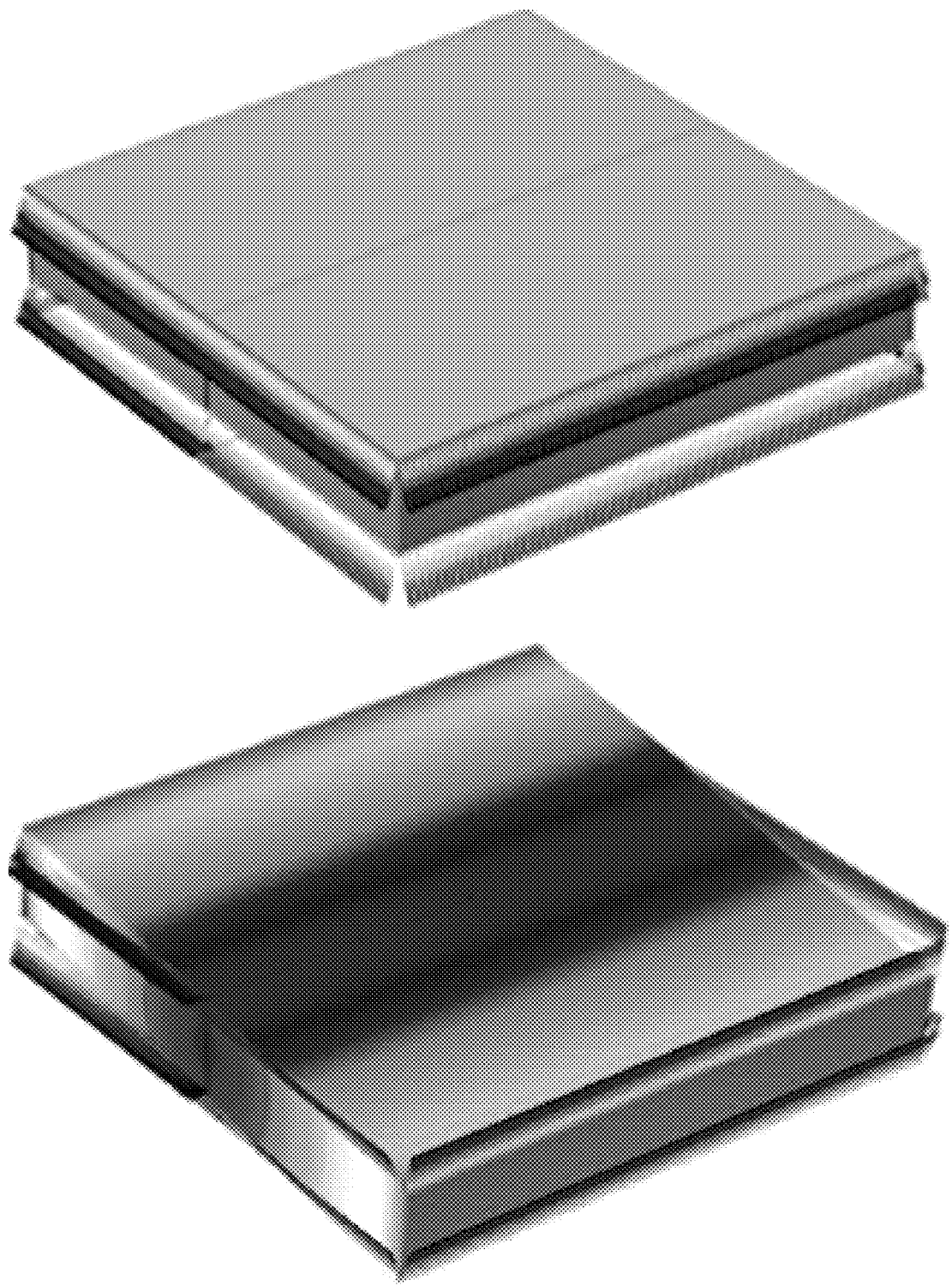
FIG. 17 shows mode shapes for the mechanical resonator according to the Example. (a) First piston mode, and (b) first rocking mode. Maximum displacement and no displacement are indicated.

The mechanical resonator has a large square single-crystal silicon proof mass (thickness: 525 µm, width: 3.02 mm (Device A) or 4.02 mm (Device B)) that is supported by an array of 1.5 µm thick silicon nitride beams, as shown in FIG. 11. These beams are located around the entire perimeter of the proof mass and on both sides of the chip, where the beam length is selected to achieve the desired stiffness. This design increases the resonance frequencies for rotational modes of the proof mass (i.e., rocking modes) so that there is a large separation in frequency between the first translational mode (i.e., piston mode) and the other vibrational modes. Structural finite element analysis (FEA) was performed for the two designs (Devices A and B) to assess the effectiveness of mode separation due to the flexural constraints. FIG. 17 shows representative mode shapes for the first piston mode and first rocking mode. The piston mode is the mode of interest for detecting accelerations perpendicular to the chip surface. This mode exhibits pure translation of the proof mass along the optical axis, such that proof mass displacement causes a length change of the optical cavity. It was found that the resonance frequency of the first rocking mode is higher than the piston mode by a factor of 11.6 for Device A and 7.8 for Device B. This mode separation is sufficient to ensure that the rocking mode does not appear within the measurement bandwidth used for FIG. 13. The closest mechanical mode detected in experiments is above 60 kHz, or a factor of 6 higher than the piston mode, as shown in FIG. 18b.

Displacement of the proof mass results in a change in cavity length, which is measured by the cavity readout. With the probing laser locked to the side of a TEM$_{00}$ optical resonance, the cavity length change, ΔL, is transduced by measuring the change in the center wavelength of the optical resonance, Δλ, using:

$$\Delta L = \frac{L}{\lambda} \Delta \lambda. \quad (10)$$

wherein L is the nominal cavity length, and λ is the nominal laser wavelength at the lock point. The change in the center wavelength, Δλ, is related to the reflected laser intensity from the cavity that is measured with a photodetector, resulting in a voltage change, ΔV. The relationship between voltage and wavelength is defined by the slope of the optical resonance at the locking point, dV/dλ, as shown in the inset of FIG. 18a. The laser was locked to the point of greatest slope for the highest transduction sensitivity. In this way, the displacement of the proof mass is found using:

$$\Delta L = \frac{L}{\lambda} \Delta V / \left(\frac{dV}{d\lambda}\right) = g_{x/V} \Delta V. \quad (11)$$

The parameters (L, λ, dV/dλ) are directly found from a spectral measurement of the cavity over a full free spectral range (FSR) and the voltage change, ΔV, is measured with an electronic spectrum analyzer (ESA).

Figure 12:
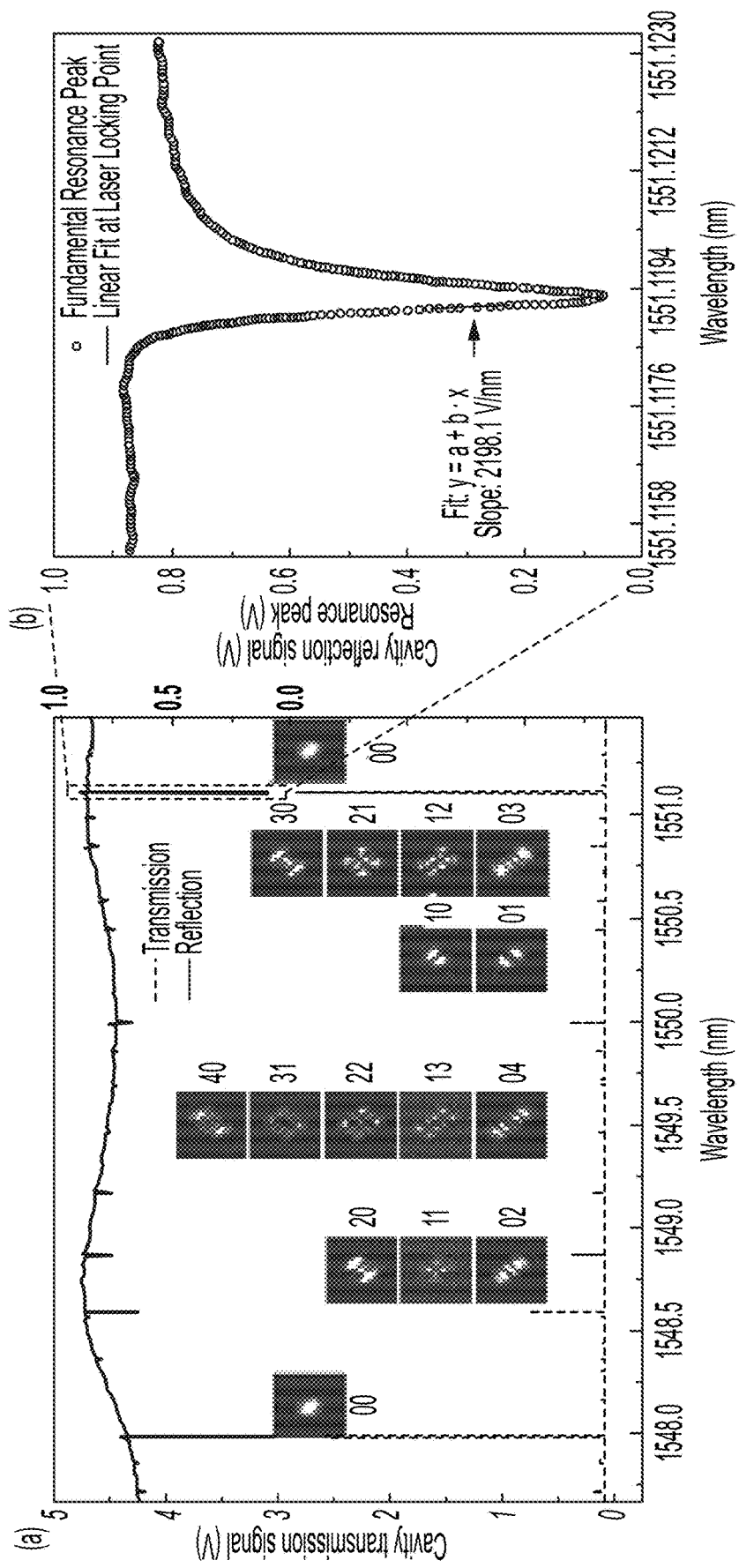
FIG. 12 shows spectra for the optical cavity according to the Example. (a) Reflected and transmitted spectra for the optical cavity over a single free spectral range (FSR) near 1550 nm. Higher-order transverse modes in addition to the fundamental (TEM00) modes are imaged in transmission using an InGaAs camera. (b) A single fundamental mode that is used to transduce the motion of the proof mass is shown, where the optical finesse F is 5430. The red region on the resonance indicates the location for side-locking to the cavity.

Two different lasers were used for cavity readout: a continuously tunable external cavity diode laser (ECDL) and a tunable fiber laser (FL) that is phase modulated with an electrooptic modulator (EOM). The ECDL has a wide wavelength tuning range and precise piezo-based wavelength control, allowing for cavity characterization and FSR measurements, as shown in FIG. 12. In comparison, the FL has a slow tuning rate and a much narrower tuning range. Furthermore, the internal feedback locking module of the ECDL enables direct and convenient cavity displacement readout. However, the ECDL has more internal frequency noise than the FL, which appears as noise equivalent displacement. Therefore, the FL was used for the displacement noise floor measurements in FIG. 13 since it has a cleaner frequency spectrum. Details on the readout method using the FL are described in the article.

Figure 18:
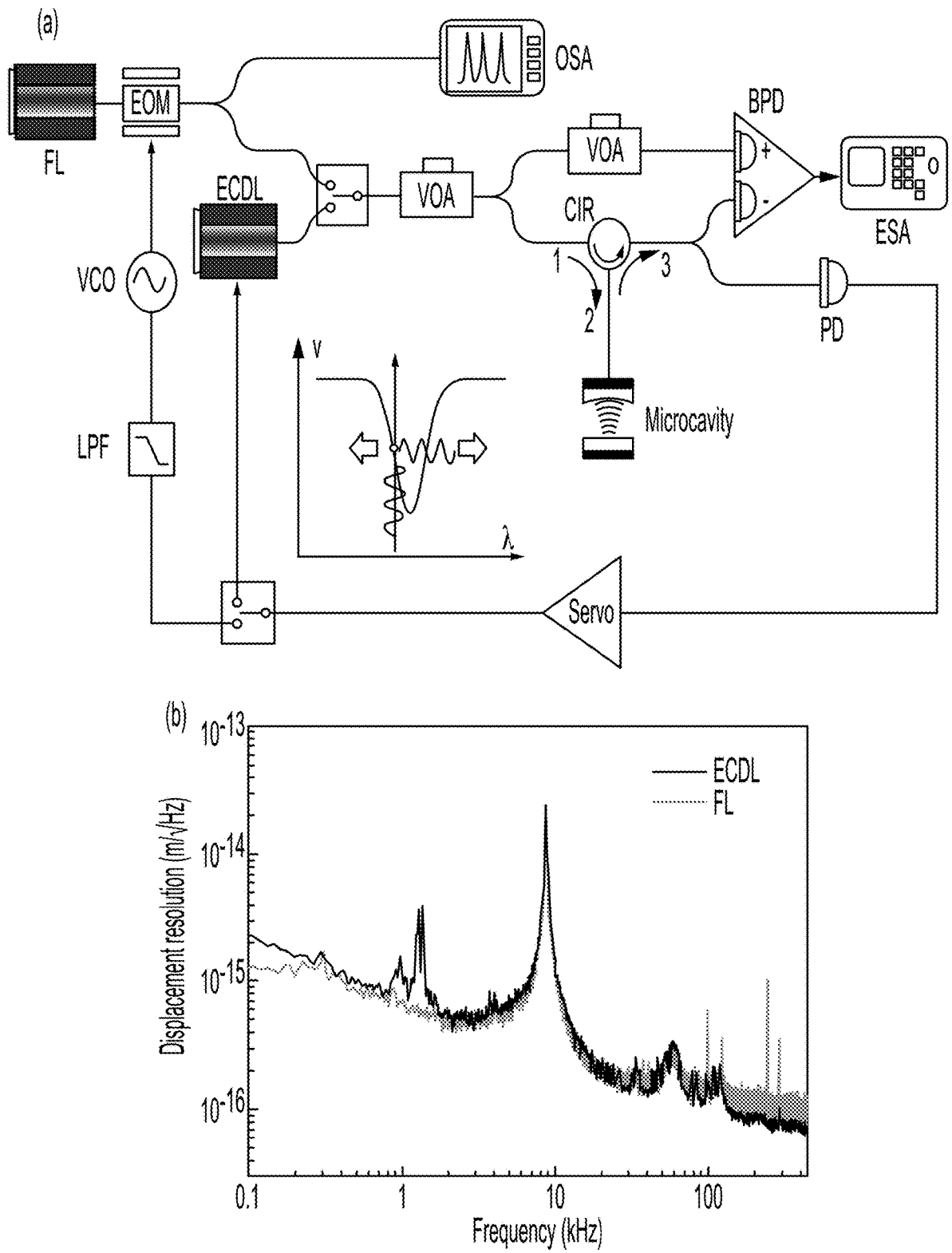
FIG. 18 shows cavity readout with the external cavity diode laser according to the Example. (a) Schematic of the cavity readout for the accelerometer using both the external cavity diode laser (ECDL) and fiber laser (FL). EOM: electrooptical modulator, SW: switch, OSA: optical spectrum analyzer; CIR: circulator, BPD: balanced photodetector, PD: photodetector, VOA: variable optical attenuator, ESA: electronic spectrum analyzer, LPF: low-pass filter, VCO: voltage-controlled oscillator. (b) Displacement noise spectra for the accelerometer when using the ECDL and FL.

Here is provided additional information on the readout with the ECDL. As shown in FIG. 18a, the main differences between using the ECDL and FL are the wavelength tuning method and the feedback servo loop. Wavelength tuning with feedback is achieved in the ECDL with a piezoelectric actuator in the external cavity. Therefore, unlike the FL, an EOM is not needed for locking. Regarding the implementation of the servo, the ECDL has an internal digital proportional-integral-derivative (PID) feedback controller while the FL servo uses an external analog PID controller. A comparison of the displacement noise spectra from the accelerometer is shown in FIG. 18b for both readout lasers. No mechanical resonances other than the fundamental near 10 kHz are observed in the accelerometer up to 60 kHz. In general, the responses from the two lasers are very similar. However, the ECDL exhibits several resonances near 1.3 kHz that were determined to be mechanical resonances within the external cavity of the laser. The measurements in FIG. 18 were performed with the ECDL since the resulting displacements are well above the noise floor and the ECDL provides wider tuning range and simpler operation.

The value of the proof mass in the mechanical resonator was calculated using the designed geometry and approximate densities for single-crystal silicon and the optical coatings, resulting in 11.07(53) mg for Device A and 19.59 (94) mg for Device B. The main source of uncertainty in the mass is the variation in the silicon wafer thickness (±25 μm) which gives a relative uncertainty of approximately 5% for the calculated mass. This only limits the a priori estimate of the mass, not the uncertainty of the acceleration measurement, which relies on in situ measurement of $\omega_0$ and Q. A similar proof mass from the same fabrication process was measured for Devices A and B after being removed from the chip. The masses were calibrated by the NIST Mass and Force Group and found to be 11.13 mg for Device A and 19.88 mg for Device B, which deviate from the calculated value by 0.5% and 1.5%, respectively. Any microbeams adhering to the proof mass after removal would increase the mass by less than 20 μg, and the uncertainty of the calibrated values is also negligible relative to the uncertainty of the calculated values.

Fitting thermomechanical noise spectra allows $\omega_0$, Q, and m to be measured, given the temperature. These values can vary over time due to changes in laboratory conditions, such as temperature, aging from sources including curing of packaging adhesive or accumulated stress from cycling between air and vacuum. To estimate the associated uncertainties, we use the standard deviation of multiple measurements on a device over a period of approximately eleven months. The uncertainty reported by the fitting routines is not included in the stated uncertainty as it is small compared to the variation over a year, even when accounting for variation in fitting procedures. This represents a conservative estimate for the measurements reported here. The uncertainty can be substantially reduced, for example by measuring ω0 and Q immediately before and after acceleration measurement, but best practice for accurate acceleration metrology with the devices is outside the scope of this work and will be reported elsewhere. For Device A the relative uncertainties for $\omega_0$, Q, and m are approximately 0.2%, 2%, and 8%, respectively. Only the uncertainties in $\omega_0$ and Q directly contribute to the uncertainty in acceleration measurement.

The homodyne Michelson interferometer used to test the accelerometer on a shaker table is shown in FIG. 18a. A 632.8 nm stabilized HeNe laser is split into the measurement and reference arms of the interferometer using a non-polarizing 50/50 beam splitter. The light in the reference arm is reflected off of a piezoelectric-actuated mirror and light in the measurement arm is reflected off of a 5 mm square gold mirror mounted on the optomechanical accelerometer package. The reflected light from both arms interferes on a photodetector. The interferometer is locked to the quadrature point (i.e., point of highest fringe slope) using the piezoelectric mirror in the reference arm and a servo controller with a bandwidth below 100 Hz. Shaker vibrations above the servo bandwidth are measured with the interferometer and are converted to displacement using the measured fringe amplitude and laser wavelength, resulting in a noise floor of approximately 60 fm/√Hz above 1 kHz. The optomechanics for the interferometer sit on the same optical table as the shaker table, making them susceptible to vibrations driven by the shaker, as seen in the data in FIG. 14.

Figure 19:
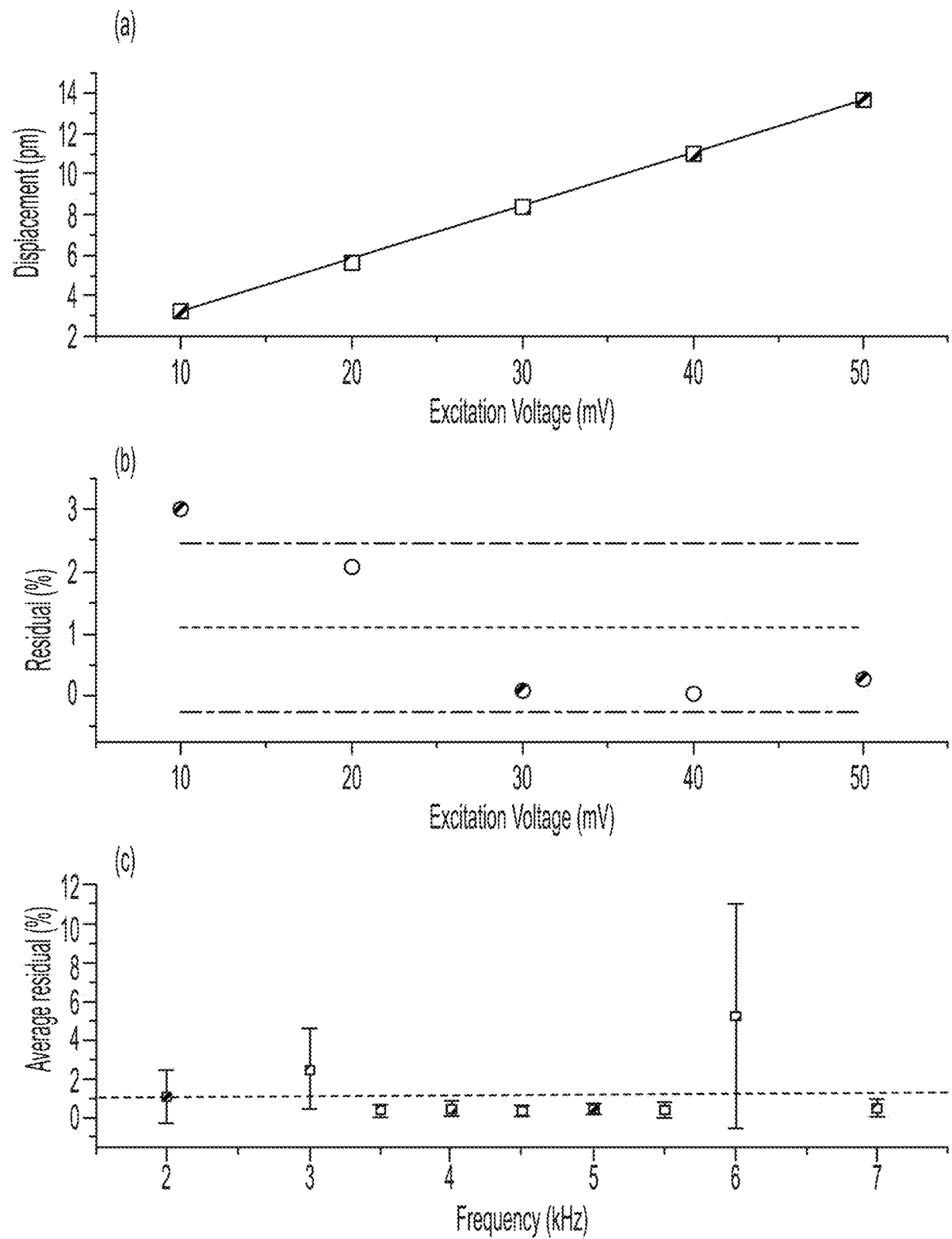
FIG. 19 shows linearity of the shaker table according to the Example. (a) Shaker table displacement as a function of excitation voltage at a drive frequency of 2 kHz. (b) Residuals from a linear fit to the data in (a). The residuals are an absolute value of the difference between the data and fit, expressed as a percentage of the fit value. Certain lines represent the mean (dash) and standard deviation (dash-dot) over the range of excitation voltages. (c) Mean and standard deviation residuals of the linear fit as a function of drive frequency. Certain line represents the mean over all frequencies.

The comparison between the accelerometer and laser interferometer shown in FIG. 14 involved a configuration wherein the excitation amplitude of the shaker be different when using the two measurement methods. This was due to the higher sensitivity of the accelerometer relative to the interferometer by a factor of approximately 600. As a result, higher excitation amplitudes were required for detection with the interferometer. Measurements with the interferometer were performed with excitation amplitudes that were as much as 50 times greater than with the accelerometer readout. Due to this, the reported displacement and acceleration data are normalized by the shaker drive voltage. This approach to the comparison is acceptable when the piezoelectric shaker table has a linear response for increasing excitation voltage. The linearity of the shaker table was characterized over a range of excitation voltages and frequencies, as shown in FIG. 19. The displacement of the shaker table for increasing excitation voltage at a single frequency (2 kHz) was found to be highly linear (FIG. 19a).

The residuals for a linear fit to the data in FIG. 19a show a deviation from linearity of no more than 3% and this deviation is much lower at higher excitation voltages due to the improved signal-to-noise ratio (FIG. 19b). Additional linearity measurements were performed between 2 kHz and 7 kHz and the mean and standard deviation of the linear fit residuals were calculated (FIG. 19c). The shaker is linear within 3% across the entire frequency range with the exception of an outlier at 6 kHz and the mean residual is 1.1%. This level of linearity is more than adequate for the comparison between the accelerometer and interferometer.

Figure 20:
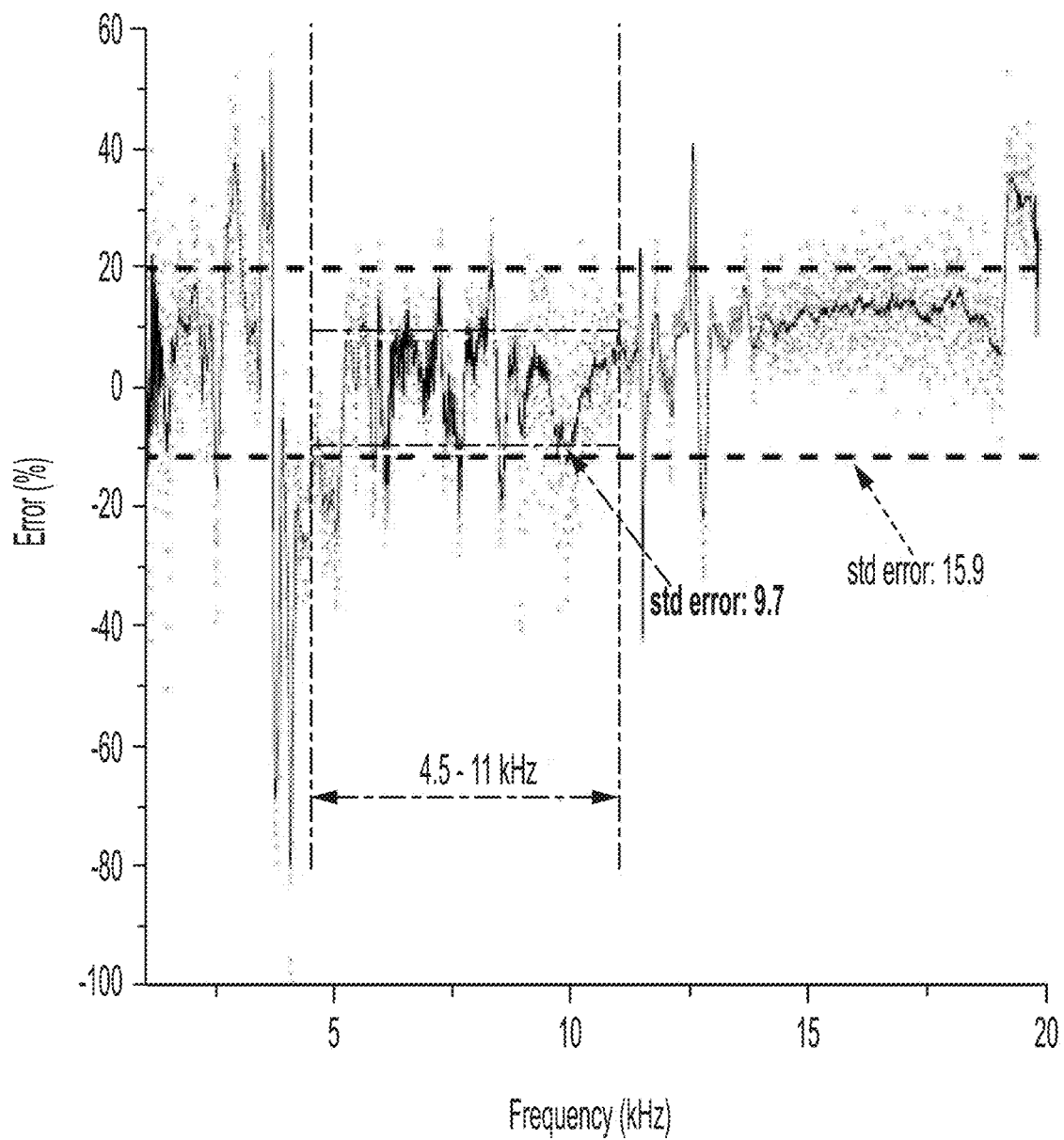
FIG. 20 shows comparison of the accelerometer and interferometer results on the shaker table. Dots: deviation of the accelerometer results from the interferometer results. Line: Same data set as dots but filtered using a moving average.

The data in FIG. 14c was analyzed to compare the results from the accelerometer and interferometer when operating on the shaker table. The deviation of the accelerometer from the interferometer was calculated as a percentage, as indicated by the dots in FIG. 20. A moving average filter was applied to the data from the interferometer because noise in the data was found to be a major contributor to the deviation between the two measurements. This resulted in data shown by the line in FIG. 20, showing a significant improvement in the comparison. The deviation for the filtered data is 5.4%±15.9% (average±standard deviation) over the entire drive frequency range (1 kHz to 20 kHz). When looking at a narrower frequency range from 4.5 kHz to 11 kHz, the deviation is −0.1%±9.7%. This deviation between accelerometer and interferometer is due to a number of factors and might be dominated by coupling between the shaker table and optomechanics in the interferometer, dynamics of the stainless-steel package, and the mounting interface.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. An optomechanical accelerometer for performing optomechanical accelerometry, the optomechanical accelerometer comprising:
   a fiducial mass comprising a fiducial reflective layer that provides a fiducial reflective cavity surface for a microscale Fabry-Perot optical cavity;
   a proof mass in optical communication with the fiducial mass and comprising a proof reflective layer that provides a proof reflective cavity surface for the microscale Fabry-Perot optical cavity, such that the proof mass linearly oscillates in a displacement motion toward and away from the fiducial mass linearly along an optical axis in response to acceleration of the optomechanical accelerometer;
   a basal member in fixed mechanical engagement with the fiducial mass, and the basal member surrounds the proof mass orthogonal to the displacement motion of the proof mass;
   a plurality of microscale beams disposed on the basal member and the proof mass and that mechanically suspends the proof mass from the basal member, such that the plurality of microscale beams comprises:
      a first microscale beam that symmetrically surrounds the proof mass orthogonal to the displacement motion of the proof mass and that is disposed on the top surface of the proof mass that includes the proof reflective surface; and
      a second microscale beam that symmetrically surrounds the proof mass orthogonal to the displacement motion of the proof mass and that is disposed on the bottom surface of the proof mass,
      such that the first microscale beam and the second microscale beam in combination constrain motion of the proof mass to only linear motion along a single axis of oscillatory movement linearly along the optical axis that is toward and away from the fiducial mass in an absence of rotation of the proof mass relative to the fiducial mass and the basal member,
      wherein the microscale beams flex in response to the displacement motion of the proof mass relative to the fiducial mass;
   the microscale Fabry-Perot optical cavity comprising the fiducial reflective layer of the fiducial mass and the proof reflective layer of the proof mass, such that the fiducial reflective layer and the proof reflective layer oppose one another and are interposed between fiducial mass and the proof mass at a cavity length that changes by an amount of displacement of the proof mass in the displacement motion relative to the fiducial mass; and a fiber optic in optical communication with and spaced apart from the proof mass and the fiducial mass, and through which excitation radiation is optically coupled into the microscale Fabry-Perot optical cavity, and that receives cavity output light from the microscale Fabry-Perot optical cavity, wherein the microscale Fabry-Perot optical cavity comprises a cavity resonance at a cavity resonance wavelength provided by the cavity length, such that the microscale Fabry-Perot optical cavity:

receives, from the fiber optic, the excitation radiation comprising an excitation wavelength and an excitation light intensity, such that excitation radiation is reflected between the proof reflective layer and the fiducial reflective layer as dynamic cavity light when the excitation wavelength is resonant with the cavity resonance wavelength; and transmits a portion of the dynamic cavity light, to the fiber optic, as cavity output light comprising a cavity output light intensity when the dynamic cavity light is produced from the excitation radiation, such that the cavity output light intensity optically indicates acceleration of the optomechanical accelerometer through mechanical displacement of the proof mass.

2. The optomechanical accelerometer of claim 1, wherein the microscale beams mechanically support the proof mass on opposing surfaces of the proof mass.

3. The optomechanical accelerometer of claim 1, wherein the microscale Fabry-Perot optical cavity is a spherical cavity.

4. The optomechanical accelerometer of claim 3, wherein the fiducial reflective layer and the proof reflective layer independently comprise a concave micromirror.

5. The optomechanical accelerometer of claim 1, wherein the microscale Fabry-Perot optical cavity is a hemispherical cavity.

6. The optomechanical accelerometer of claim 5, wherein the proof reflective layer comprises a concave micromirror, and the fiducial reflective layer comprises a planar micromirror.

7. The optomechanical accelerometer of claim 5, wherein the fiducial reflective layer comprises a concave micromirror, and the proof reflective layer comprises a planar micromirror.

8. The optomechanical accelerometer of claim 1, wherein the microscale Fabry-Perot optical cavity is a planar-parallel cavity with the fiducial reflective layer and the proof reflective layer independently comprising a planar micromirror.

9. The optomechanical accelerometer of claim 1, further comprising a lens in optical communication with the microscale Fabry-Perot optical cavity and that communicates the excitation radiation to the microscale Fabry-Perot optical cavity and receives the cavity output light from the microscale Fabry-Perot optical cavity.

10. The optomechanical accelerometer of claim 9, further comprising a housing in which is disposed the microscale Fabry-Perot optical cavity, the proof mass, the fiducial mass, the basal member, the microscale beams, the lens, and a fiber optic in optical communication with the lens and that communicates the excitation radiation to the microscale Fabry-Perot optical cavity and receives the cavity output light from the lens.

11. The optomechanical accelerometer of claim 1, further comprising a second microscale Fabry-Perot optical cavity disposed on an opposite side of proof mass as the microscale Fabry-Perot optical cavity.

12. The optomechanical accelerometer of claim 11, wherein the second microscale Fabry-Perot optical cavity further comprises:

a second fiducial reflective layer disposed on a second fiducial mass;

a second proof reflective layer disposed on the proof mass opposing the second fiducial reflective layer and in optical communication with the second fiducial reflective layer;

a second cavity length, such that the second fiducial reflective layer and the second proof reflective layer oppose one another and are interposed between second fiducial mass and the proof mass at the second cavity length that changes by an amount of displacement of the proof mass in the displacement motion relative to the second fiducial mass, and a second cavity resonance at a second cavity resonance wavelength provided by the second cavity length, such that the second microscale Fabry-Perot optical cavity:

receives second excitation radiation comprising a second excitation wavelength and a second excitation light intensity, such that the second excitation radiation is reflected between the second proof reflective layer and the second fiducial reflective layer as second dynamic cavity light when the second excitation wavelength is resonant with the second cavity resonance wavelength; and transmits a portion of the second dynamic cavity light as second cavity output light comprising a second cavity output light intensity when the second dynamic cavity light is produced from the second excitation radiation, such that the second cavity output light intensity optically compensates for a change in a size of the proof mass that perturbs the cavity length.

13. The optomechanical accelerometer of claim 1, further comprising a static optical cavity that comprises:

an optically reflective surface disposed on the fiducial mass;

an optically reflective surface disposed on the basal member opposing the optically reflective surface disposed on the fiducial mass and in communication with the optically reflective surface disposed on the fiducial mass;

a static cavity length that comprises a static cavity resonance at a static cavity resonance wavelength, such that the static optical cavity:

receives a second excitation radiation comprising a second excitation wavelength;

when the second excitation wavelength is resonant with the static cavity resonance wavelength, stores some of the second excitation radiation as static cavity light; and transmits a portion of the static cavity light as static cavity output light when the static cavity light is produced from the second excitation radiation, such that the static cavity output light compensates cavity output light for a change in a size of the proof mass that perturbs the cavity length.

14. An optomechanical accelerometer array for performing optomechanical accelerometry, the optomechanical accelerometer array comprising a plurality of the optomechanical accelerometers of claim 1, wherein the individual optomechanical accelerometers are arranged in an array format.

15. The optomechanical accelerometer of claim 14, further comprising:
 a lenslet array comprising a plurality of lenses, wherein each lenslet is individually disposed in optical communication with one of the microscale Fabry-Perot optical cavities of the optomechanical accelerometers.

16. A process for performing optomechanical accelerometry, the process comprising:
 receiving, by a microscale Fabry-Perot optical cavity of an optomechanical accelerometer, excitation radiation comprising an excitation wavelength, the optomechanical accelerometer comprising:
  a fiducial mass comprising a fiducial reflective layer that provides a fiducial reflective cavity surface for the microscale Fabry-Perot optical cavity;
  a proof mass in optical communication with the fiducial mass and comprising a proof reflective layer that provides a proof reflective cavity surface for the microscale Fabry-Perot optical cavity, such that the proof mass linearly oscillates in a displacement motion toward and away from the fiducial mass linearly along an optical axis in response to acceleration of the optomechanical accelerometer;
  a basal member in fixed mechanical engagement with the fiducial mass, and the basal member surrounds the proof mass orthogonal to the displacement motion of the proof mass;
  a plurality of microscale beams disposed on the basal member and the proof mass and that mechanically suspends the proof mass from the basal member, such that the plurality of microscale beams comprises:
   a first microscale beam that symmetrically surrounds the proof mass orthogonal to the displacement motion of the proof mass and that is disposed on the top surface of the proof mass that includes the proof reflective surface; and
   a second microscale beam that symmetrically surrounds the proof mass orthogonal to the displacement motion of the proof mass and that is disposed on the bottom surface of the proof mass,
   such that the first microscale beam and the second microscale beam in combination constrain motion of the proof mass to only linear motion along a single axis of oscillatory movement linearly along the optical axis that is toward and away from the fiducial mass in an absence of rotation of the proof mass relative to the fiducial mass and the basal member,
  wherein the microscale beams flex in response to the displacement motion of the proof mass relative to the fiducial mass;
  the microscale Fabry-Perot optical cavity comprising the fiducial reflective layer of the fiducial mass and the proof reflective layer of the proof mass, such that the fiducial reflective layer and the proof reflective layer oppose one another and are interposed between fiducial mass and the proof mass at a cavity length that changes by an amount of displacement of the proof mass in the displacement motion relative to the fiducial mass; and
  a fiber optic in optical communication with and spaced apart from the proof mass and the fiducial mass, and through which excitation radiation is optically coupled into the microscale Fabry-Perot optical cavity, and that receives cavity output light from the microscale Fabry-Perot optical cavity,
  wherein the microscale Fabry-Perot optical cavity comprises a cavity resonance at a cavity resonance wavelength provided by the cavity length;
 receiving, by the microscale Fabry-Perot optical cavity, the excitation radiation from the fiber optic;
 reflecting, in the microscale Fabry-Perot optical cavity, the excitation radiation between the proof reflective layer and the fiducial reflective layer as dynamic cavity light when the excitation wavelength is resonant with the cavity resonance wavelength;
 transmitting, from the microscale Fabry-Perot optical cavity to the fiber optic, a portion of the dynamic cavity light as cavity output light comprising an cavity output light intensity when the dynamic cavity light is produced from the excitation radiation; and
 determining, from the cavity output light intensity, acceleration of the optomechanical accelerometer through mechanical displacement of the proof mass to perform optomechanical accelerometry.

* * * * *